United States Patent [19]
Blong et al.

[11] Patent Number: 5,830,947
[45] Date of Patent: Nov. 3, 1998

[54] EXTRUDABLE THERMOPLASTIC HYDROCARBON COMPOSITIONS

[75] Inventors: Thomas J. Blong, Woodbury; Michael P. Greuel, White Bear Township, both of Minn.; Claude Lavallee, London, Canada

[73] Assignee: Minnesota Mining and Manufacturing, St. Pual, Minn.

[21] Appl. No.: 956,090

[22] Filed: Oct. 23, 1997

Related U.S. Application Data

[60] Provisional application No. 60/003811 Sep. 15, 1995.

[62] Division of Ser. No. 559,789, Nov. 15, 1995, Pat. No. 5,710,217.

[51] Int. Cl.$^6$ .............................. C08L 23/04; C08L 27/18; C08L 71/02
[52] U.S. Cl. ............................. 525/187; 524/377; 524/378
[58] Field of Search ............................. 525/187; 524/377, 524/378

[56] References Cited

U.S. PATENT DOCUMENTS

| | | | |
|---|---|---|---|
| 3,125,547 | 3/1964 | Blatz ..................................... | 260/45.5 |
| 4,463,144 | 7/1984 | Kojima et al. ............................. | 526/94 |
| 4,558,141 | 12/1985 | Squire ..................................... | 549/455 |
| 4,749,752 | 6/1988 | Youlu et al. ............................. | 525/199 |
| 4,863,983 | 9/1989 | Johnson et al. ......................... | 524/140 |
| 4,904,735 | 2/1990 | Chapman, Jr. et al. ................. | 525/199 |
| 4,983,677 | 1/1991 | Johnson et al. ......................... | 525/127 |
| 5,010,130 | 4/1991 | Chapman, Jr. et al. ................. | 524/445 |
| 5,015,693 | 5/1991 | Duchesne et al. ....................... | 525/187 |
| 5,064,594 | 11/1991 | Priester et al. .......................... | 264/127 |
| 5,087,680 | 2/1992 | Duan et al. .............................. | 526/254 |
| 5,089,200 | 2/1992 | Chapman, Jr. et al. ................. | 264/127 |
| 5,106,911 | 4/1992 | Chapman, Jr. et al. ................. | 525/199 |
| 5,132,368 | 7/1992 | Chapman, Jr. et al. ................. | 525/165 |
| 5,266,639 | 11/1993 | Chapman, Jr. et al. ................. | 525/200 |
| 5,284,184 | 2/1994 | Noone et al. ............................ | 138/121 |
| 5,285,002 | 2/1994 | Grootaert ................................ | 526/222 |
| 5,378,782 | 1/1995 | Grootaert ................................ | 526/255 |
| 5,397,897 | 3/1995 | Komatasu et all .................. | 250/338.4 |

FOREIGN PATENT DOCUMENTS

| | | | |
|---|---|---|---|
| 0 601 455 | 6/1994 | European Pat. Off. ........ | C08L 23/10 |
| WO 94/05712 | 3/1994 | WIPO ........................... | C08F 214/26 |

OTHER PUBLICATIONS

R. F. Westover, "Melt Extrusion," *Encyclopedia of Polymer Science and Technology*, vol. 8, pp. 573–81 (John Wiley & Sons 1968).

A. Rudin et al., "Fluorocarbon Elastomer Aids Polyolefin Extrusion," *Plastics Engineering*, pp. 63–66 (Mar. 1986).

C. Rauwendaal, "Polymer Extrusion," pp. 23–48, (Hanser Publishers 1986).

P.J. Carreau, "Rheological Equations from Molecular Network Theories," *Transactions of the Society of Rheology*, vol. 16, pp. 99–127 (John Wiley & Sons 1972).

K. Yasuda et al., "Shear Flow Properties of Concentrated Solutions of Linear and Star Branched Polystyrenes," *Rheol. Acta*, vol. 20, No. 2, pp. 163–178, (1981).

L.A. Utracki et al., "Linear Low Density Polyethylenes and Their Blends," *Polymer Engineering and Science*, vol. 27, No. 5, pp. 367–379 (Mar., 1987).

D. W. Marquardt, "An Algorithm for Least–Squares Estimation of Nonlinear Parameters," *Journal of the Society of Industrial Applied Mathmatics*, vol. 11, No. 2, pp. 431–441 (Jun. 1963).

H. A. Schneider et al., "Some Remarks Concerning the WLF–Relation," *Polymer Bulletin*, vol. 14, pp. 479–485 (1985).

M. Fleissner, "Characterization of Polymer Molecular Mass Distribution from Rheological Measurements," *Makromol. Chem., Macromol. Symp.*, vol. 61, pp. 324–341 (1992).

K. Bernreitner et al., "Correlation Between Molecular Structure and Rheological Behavior of Polypropylene," *Polymer Testing*, vol. 11, pp. 89–100 (1992).

K. Fronek et al., "Tailoring Processing Additives for High Density Polyethylene Applications," 3M Canada Inc., presented at Society of Plastics Engineers Antec '90 Conference, Dallas Tx (May 1990).

*Primary Examiner*—David Buttner
*Attorney, Agent, or Firm*—John A. Burtis

[57] ABSTRACT

Briefly, in one aspect, this invention provides a melt-processable composition comprising, in admixture: (1) one or more melt-processable thermoplastic hydrocarbon polymers as the major component of the composition by weight, and, as a minor component of the composition by weight, (2) an effective amount of a chemically-resistant, fluoropolymer process aid to improve the processability of the composition and (3) one or more poly(oxyalkylene) polymers.

8 Claims, 1 Drawing Sheet

EXTRUDABLE THERMOPLASTIC HYDROCARBON COMPOSITIONS

CROSS-REFERENCE TO RELATED APPLICATION

This is a division of application Ser. No. 08/559,789 filed Nov. 15, 1995 now U.S. Pat. No. 5,710,217 which claims priority to U.S. Provisional Application No. 60/003,811, filed Sep. 15, 1995.

FIELD OF THE INVENTION

This invention relates to thermoplastic hydrocarbon polymers, such as polyolefins, having improved extrusion characteristics. In another aspect, it relates to the use of fluorocarbon polymers to improve the extrusion characteristics of such thermoplastic hydrocarbon polymers. In a further aspect, it relates to a polymer processing aid composition.

BACKGROUND

For any extrudable polymer composition, there exists a critical shear rate above which the surface of the extrudate becomes rough and below which the extrudate will be smooth. See, for example, R. F. Westover, *Melt Extrusion*, 8 Encyclopedia of Polymer Science and Technology 573–81 (John Wiley & Sons 1968). The desire for a smooth extrudate surface competes, and must be optimized with respect to, the economic advantages of extruding a polymer composition at the fastest possible speed (i.e. at high shear rates).

Some of the various types of extrudate roughness and distortion observed in high and low density polyethylenes are described by A. Rudin, et al., *Fluorocarbon Elastomer Aids Polyolefin Extrusion*, Plastics Engineering, March 1986, at 63–66. The authors state that for a given set of processing conditions and die geometry, a critical shear stress exists above which polyolefins such as linear low-density polyethylene (LLDPE), high-density polyethylene (HDPE), and polypropylene suffer melt defects. At low shear rates, defects may take the form of "sharkskin," a loss of surface gloss, that in more serious manifestations appears as ridges running more or less transverse to the extrusion direction. At higher rates, the extrudate can undergo "continuous melt fracture" becoming grossly distorted. At rates lower than those at which continuous melt fracture is first observed, LLDPE and HDPE can also suffer from "cyclic melt fracture," in which the extrudate surface varies from smooth to rough. The authors state further that lowering the shear stress by adjusting the processing conditions or changing the die configuration can avoid these defects to a limited extent, but not without creating an entirely new set of problems. For example, extrusion at a higher temperature can result in weaker bubble walls in tubular film extrusion, and a wider die gap can affect film orientation.

Certain fluorocarbon elastomer processing aids are known to partially alleviate melt defects in extrudable thermoplastic hydrocarbon polymers and allow for faster, more efficient extrusion. U.S. Pat. No. 3,125,547 to Blatz, for example, first described the use of fluorocarbon polymer process aids with melt-extrudable hydrocarbon polymers wherein the fluorinated polymers are homopolymers and copolymers of fluorinated olefins having an atomic fluorine to carbon ratio of at least 1:2 and wherein the fluorocarbon polymers have melt flow characteristics similar to that of the hydrocarbon polymers.

U.S. Pat. No. 4,904,735 (Chapman, Jr. et al.) describes a fluorinated processing aid for use with a difficultly melt-processable polymer comprising (1) a fluorocarbon copolymer which at the melt-processing temperature of the difficultly melt-processable polymer is either in a melted form if crystalline, or is above its glass transition temperature if amorphous, and (2) at least one tetrafluoroethylene homopolymer or copolymer of tetrafluoroethylene and at least one monomer copolymerizable therewith wherein the mole ratio is at least 1:1, and which is solid at the melt-processable temperature of the difficultly melt-processable polymer.

U.S. Pat. No. 5,397,897 to Morgan et al. describes the use of copolymers of tetrafluoroethylene and hexafluoropropylene having high hexafluoropropylene content as processing aids in polyolefins.

U.S. Pat. Nos. 5,064,594 (Priester et al.) and 5,132,368 (Chapman, Jr. et al. describe the use of certain fluoropolymer process aids containing functional polymer chain end groups including —COF, —SO$_2$F, —SO$_2$Cl, SO$_3$M, —OSO$_3$M, and —COOM, wherein is M hydrogen, a metal cation, or a quaternary ammonium cation for use with a difficultly melt-processable polymer.

While these known fluoropolymer process aids may provide improved extrusion characteristics over extrudable compositions formulated in their absence, enabling substantially faster extrusion rates and yielding extrudates with smoother surfaces, many of the fluoropolymers within the compositions are themselves susceptible to chemical attack by basic or amine-containing extrudate additives, particularly to light stabilizers. As a result, these fluoropolymer process aids readily degrade within the extrudable composition and lose their effectiveness. Also as a result of chemical activity, these fluoropolymers can severely discolor, often resulting in discoloration or loss of transparency of the final extrudate even if present in the extrudable composition at relatively low concentrations.

SUMMARY

Briefly, in one aspect, this invention provides a melt-processable composition comprising, in admixture: (1) one or more melt-processable thermoplastic hydrocarbon polymers as the major component of the composition by weight, and, as a minor component of the composition by weight, (2) an effective amount of a chemically-resistant, fluoropolymer process aid to improve the processability of the composition. The fluoropolymer process aid contains at least about 50 weight percent of fluorine and comprises one or more fluoropolymers which are essentially completely ethylenically saturated and consist essentially of interpolymerized units derived from the following monomers:

(a) one or more fluorinated olefin monomers having the following general formula:

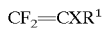

$CF_2=CXR^1$ wherein:
X is a hydrogen or a halogen atom; and
$R^1$ is a halogen atom or is an alkyl, cyclic alkyl, or aryl group having from 1 to 10 carbon atoms, and preferably it is either a halogen atom or a group having 1 to 2 carbon atoms; $R^1$ groups may contain one or more heteroatoms such as nitrogen or oxygen and may be partially-, fully- or non-halogenated, provided, however, that whenever X is a hydrogen atom, $R^1$ contains an allylic carbon atom relative to the α-unsaturation and that allylic carbon atom is not perfluorinated;

(b) one or more olefin monomers of the general formula:

$$CH_2=CXR^2$$

wherein:
X is a hydrogen or a halogen atom; and
$R^2$ is a hydrogen or a halogen atom with the proviso that $R^2$ and X are not both fluorine; $R^2$ may also be an alkyl, cyclic alkyl, or aryl group having from 1 to 10 carbon atoms, and preferably is a hydrogen atom or a group having 1 to 2 carbon atoms; and $R^2$ may be partially-, fully- or non-halogenated and may contain one or more heteroatoms such as oxygen or nitrogen; and
(c) 0 to 15 weight percent, of the total weight of the fluoropolymer, of one or more monomers that produce an acidic hydrogen on the backbone of the resulting fluoropolymer after polymerization.

Component (2) has a Carreau-Yasuda Equation m1 parameter of about 0.7 or less, and the ratio of the melt viscosity of component (2) to the melt viscosity of component (1) is between about 0.01 and 100 at the melt processing conditions of the composition. The above-described admixture of components (1) and (2) may also be admixed with other conventional additives and adjuvants, such as fluorinated and non-fluorinated process additives, light stabilizers, antioxidants, fillers, antiblocking agents, and pigments.

In a particularly preferred embodiment of the melt-processable composition described above, the fluoropolymer process aid contains at least 65 weight percent fluorine and consists essentially of one or more of the fluoropolymers described above. However, in this embodiment, the fluoropolymers consist essentially of interpolymerized units derived from: (a) one or more monomers selected from the group consisting of tetrafluoroethylene and hexafluoropropylene, (b) one or more monomers selected from the group consisting of propylene and ethylene, and (c) from 0 to 10 wt. % of one or more monomers selected from the group consisting of vinylidene fluoride, trifluoroethylene, 1-hydropentafluoropropene and 2-hydropentafluoropropene.

In another aspect, the present invention provides a melt-processable composition that further comprises a small amount (i.e., less than 20 percent by weight and preferably less than 2 percent by weight of the melt-processable composition) of a poly(oxyalkylene) polymer component dispersed in the hydrocarbon polymer. In a particularly preferred embodiment of this invention, the poly(oxyalkylene) polymer component consists essentially of one or more poly(oxyalkylene) polymers.

In yet another aspect, this invention provides a method of improving the extrusion characteristics of melt-processable thermoplastic hydrocarbon polymers by using an effective amount of any of the fluoropolymer process aids described above, and optionally, a small but effective amount of the poly(oxyalkylene) polymer components described above.

In yet another aspect, this invention provides a processing aid composition useful for improving the extrusion characteristics of thermoplastic, melt-processable hydrocarbon polymers comprising, in admixture, any of the poly(oxyalkylene) polymer components described above and any of the fluoropolymer process aids described above. A preferred embodiment of the processing aid composition comprises, and preferably consists essentially of, about 5 to 95 weight percent of the poly(oxyalkylene) polymer component and about 95 to 5 weight percent of the fluoropolymer process aid.

DETAILED DESCRIPTION

Figure 1:
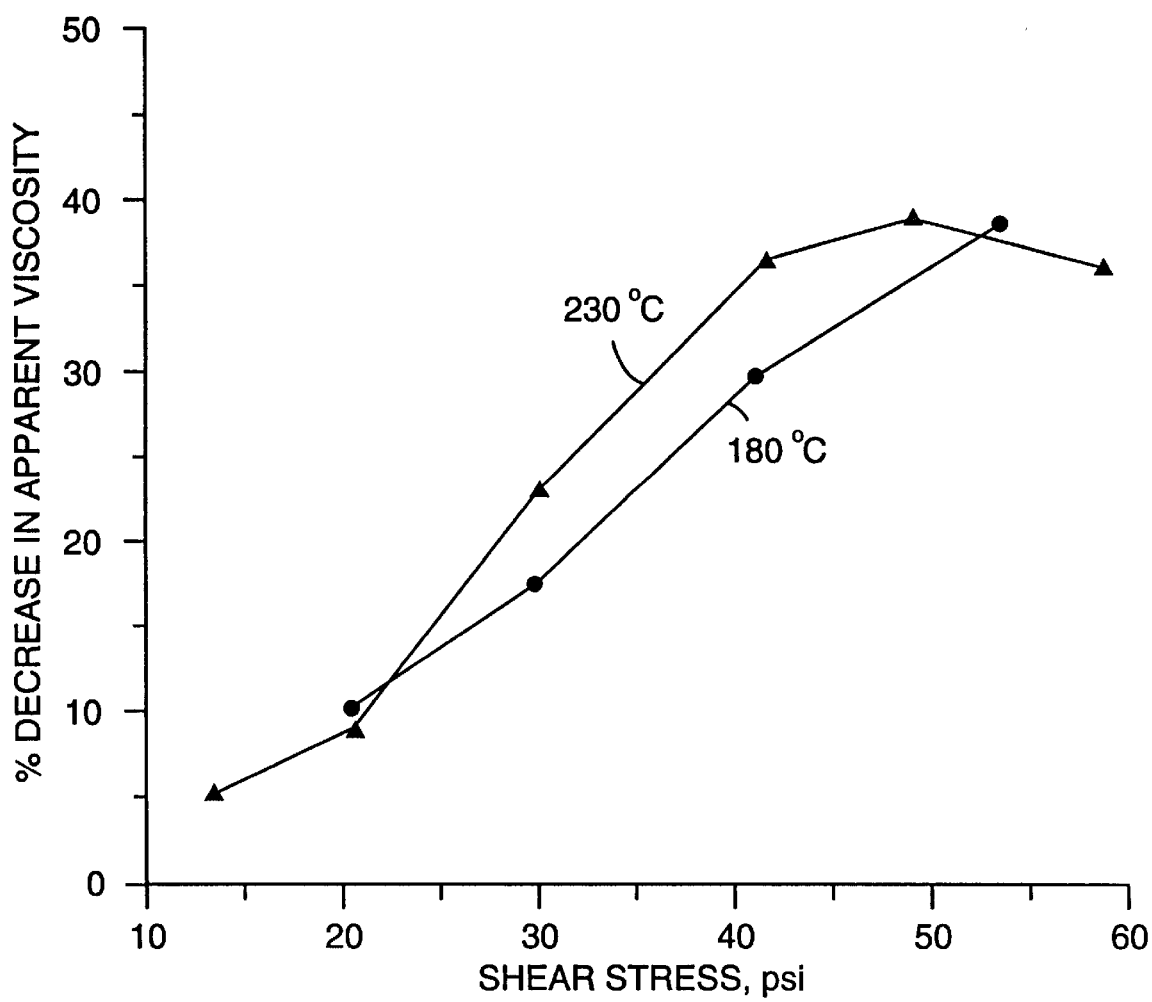
FIG. 1 is a plot of the percent decrease in apparent viscosity vs. shear stress of base resin at 190° C. and at 230° C. of a fluoropolymer in a thermoplastic hydrocarbon resin in accordance with the invention.

The compositions of the present invention are effective in reducing melt defects in thermoplastic hydrocarbon polymers, e.g. polyolefins, or in postponing these defects to higher extrusion rates than can be achieved without such processing aids. The fluoropolymer process aids of this invention furthermore reduce or eliminate the existence of melt defects such as sharkskin in extruded thermoplastic hydrocarbon polymers without alteration of the chemical structure of the thermoplastic polymer and without the need for resorting to conventional methods of reducing melt defecting such as raising the melt-processing temperature or extruding at slower line speeds and lower shear rates. The fluoropolymer process aids of this invention are chemically stable in the presence of other additives, e.g., hindered amine light stabilizers, both under processing conditions and within the finished plastic article, yet they possess viscosities which permit efficient and easy incorporation into the thermoplastic hydrocarbon polymer melt. They also possess polydispersities or molecular weight distributions which permit the fluoropolymer process aid to function more efficiently over a range of processing or extrusion temperatures. Additionally, the fluoropolymer process aids retain most their efficiency even in extrudable compositions in which antioxidant consumption takes place (e.g., compositions containing minimal levels of antioxidant). As a result, less fluoropolymer can be used to achieve a melt-defect-free extrudate at a particular set of operating conditions, extrusion efficiencies can be retained even when processing temperature varies somewhat and the extrudate will retain its initial color better over time. The fluoropolymer process aids are also effective in reducing die buildup within an extruder. The compositions of the invention find particular utility in extrusion applications such as film, pipe, sheet, rod, fiber, and blow molding.

The amount of the fluoropolymer process aid necessary to provide a desired reduction in sharkskin and other melt defect phenomena will depend upon a number of factors including the particular melt-processable thermoplastic hydrocarbon polymer used, the formulation of that thermoplastic hydrocarbon polymer (i.e., the amount and types of additives present), and the process conditions under which the composition is to be extruded.

Generally, the fluoropolymer process aid is present in the melt-processable composition at a low concentration. However, this may vary depending upon whether the melt-processable composition is to be extruded into its final form (e.g., a film) or whether the melt-processable composition is to be used as a masterbatch and is to be further diluted with thermoplastic polymer before it is extruded into its final form. Generally, the fluoropolymer process aid is present in the melt-processable composition at a concentration of about 0.005 and 50 weight percent. If the melt-processable composition is a masterbatch, the amount of fluoropolymer process aid in the composition may vary between about 2 to 50 weight percent of the composition. If the melt-processable composition is to be extruded into final form and is not further diluted by the addition of thermoplastic hydrocarbon polymer, the melt-processable composition typically contains a lower concentration of fluoropolymer process aid, e.g., about 0.005 to 2 weight percent, and preferably about 0.01 and 0.2 weight percent of the melt-processable composition. In any event, the upper concentration of the fluoropolymer process aid in the melt-processable composition generally is determined by economic limitations rather than by any adverse physical effect of the concentration of the processing aid.

The thermoplastic hydrocarbon polymers to which the fluoropolymer process aids of the present invention are added comprise polymers obtained by the homopolymerization or copolymerization of olefins, as well as copolymers of one or more olefins and up to about 30 weight percent or more, but preferably 20 weight percent or less, of one or more monomers that are copolymerizable with such olefins, e.g. vinyl ester compounds such as vinyl acetate. The olefins may be characterized by the general structure $CH_2=CHR$, wherein R is a hydrogen or an alkyl radical, and generally, the alkyl radical contains not more than 10 carbon atoms, preferably from one to six carbon atoms. Representative olefins are ethylene, propylene, 1-butene, 1-hexene, 4-methyl-1-pentene, and 1-octene. Representative monomers that are copolymerizable with the olefins include: vinyl ester monomers such as vinyl acetate, vinyl propionate, vinyl butyrate, vinyl chloroacetate, and vinyl chloropropionate; acrylic and alpha-alkyl acrylic acid monomers and their alkyl esters, amides, and nitriles such as acrylic acid, methacrylic acid, ethacrylic acid, methyl acrylate, ethyl acrylate, N,N-dimethyl acrylamide, methacrylamide, and acrylonitrile; vinyl aryl monomers such as styrene, o-methoxystyrene, p-methoxystyrene, and vinyl naphthalene; vinyl and vinylidene halide monomers such as vinyl chloride, vinylidene chloride, and vinylidene bromide; alkyl ester monomers of maleic and fumaric acid and anhydrides thereof such as dimethyl maleate, diethyl maleate, and maleic anhydride; vinyl alkyl ether monomers such as vinyl methyl ether, vinyl ethyl ether, vinyl isobutyl ether, and 2-chloroethyl vinyl ether; vinyl pyridine monomers; N-vinyl carbazole monomers; and N-vinyl pyrolidine monomers. The thermoplastic hydrocarbon polymers also include the metallic salts of said olefin copolymers, or blends thereof, that contain free carboxylic acid groups. Illustrative of the metals that can be used to provide the salts of said carboxylic acids polymers are the one, two, and three valence metals such as sodium, lithium, potassium, calcium, magnesium, aluminum, barium, zinc, zirconium, beryllium, iron, nickel, and cobalt. The thermoplastic hydrocarbon polymers also include blends of thermoplastic hydrocarbon polymers with other thermoplastic hydrocarbon polymers or blends thereof containing conventional adjuvants such as antioxidants, light stabilizers, fillers, antiblocking agents, and pigments.

Representative examples of thermoplastic hydrocarbon polymers useful in the present invention are polyethylene, polypropylene, poly(1-butene), poly(3-methylbutene), poly(4-methylpentene) and copolymers of ethylene with propylene, 1-butene, 1-hexene, 1-octene, 1-decene, 4-methyl-1-pentene, and 1-octadecene.

Representative blends of thermoplastic hydrocarbon polymers useful in the invention are blends of polyethylene and polypropylene, linear or branched low-density polyethylenes, high-density polyethylenes, and polyethylene and olefin copolymers containing said copolymerizable monomers, some of which are described above, e.g., ethylene and acrylic acid copolymers; ethylene and methyl acrylate copolymers; ethylene and ethyl acrylate copolymers; ethylene and vinyl acetate copolymers; ethylene, acrylic acid, and ethyl acrylate copolymers; and ethylene, acrylic acid, and vinyl acetate copolymers.

Typically, melt defect phenomena are most pronounced in those thermoplastic hydrocarbon polymers that have an ASTM D 1238 melt flow index of less than 2 g/10 min. measured at 190° C. with a loading of 2.16 kg. The fluoropolymer process aid and the process aids of this invention are therefore most useful in eliminating melt defects in these thermoplastic hydrocarbon polymers. The fluoropolymer process aids and the processing aids described herein may also be used in thermoplastic hydrocarbon polymers with a higher melt index, e.g., for reducing or eliminating die buildup.

The thermoplastic hydrocarbon polymers may be used in the form of powders, pellets, granules, or in any other extrudable form. The preferred thermoplastic hydrocarbon polymers of the invention are homopolymers of ethylene and propylene or copolymers of ethylene and 1-butene, 1-hexene, 1-octene, 4-methyl-1-pentene, propylene, vinyl acetate and methyl acrylate.

The fluoropolymer process aids admixed with the thermoplastic hydrocarbon polymers of this invention are generally copolymers of: (a) one or more fluorinated olefin monomers with (b) one or more substantially nonfluorinated hydrocarbon olefin monomers, and optionally with (c) a limited amount of vinylidene fluoride or one or more other monomers that yield acidic hydrogen on the backbone of the resulting fluoropolymer.

The fluorinated olefin (a) monomers may be characterized according to the general structure:

$$CF_2=CXR^1$$

wherein:

X is a hydrogen or a halogen atom; and $R^1$ is a halogen atom or is an alkyl, cyclic alkyl, or aryl group having from 1 to 10 carbon atoms, and preferably it is either a halogen atom or a group having 1 to 2 carbon atoms; $R^1$ groups may contain one or more heteroatoms such as oxygen or nitrogen and may be partially-, fully- or non-halogenated, for example with fluorine atoms, provided, however, that when X is a hydrogen atom, $R^1$ contains an allylic carbon atom relative to the α-unsaturation and that allylic carbon atom is not perfluorinated (i.e. the allylic carbon atom is not saturated with fluorine atoms).

The substantially nonfluorinated olefin (b) monomers copolymerized with the fluorinated (a) monomer or monomers may be characterized according to the general structure:

$$CH_2=CXR^2$$

wherein:

X is a hydrogen or a halogen atom; and $R^2$ is a hydrogen or a halogen atom with the proviso that $R^2$ and X are not both fluorine; $R^2$ may also be an alkyl, cyclic alkyl, or aryl group having from 1 to 10 carbon atoms; preferably $R^2$ is a hydrogen atom or a group having 1 to 2 carbon atoms; $R^2$ group may be partially-, fully- or non-halogenated, for example with fluorine atoms, and may contain one or more heteroatoms such as oxygen or nitrogen. $R^2$ preferably is nonfluorinated but may be fluorinated.

Representative fluorinated olefin (a) monomers are tetrafluoroethylene, hexafluoropropene, chlorotrifluoroethylene, 2-chloropentafluoropropene, perfluoroalkyl vinyl ethers, e.g. $CF_3OCF=CF_2$ or $CF_3CF_2CF_2OCF=CF_2$, dichlorodifluoroethylene, 1,1- dichlorofluoroethylene, and mixtures thereof Perfluoro-1,3-dioxoles may also be used. The perfluoro-1,3-dioxole monomers and their copolymers are described, for example, in U.S. Pat. No. 4,558,141 (Squire). Tetrafluoroethylene or hexafluoropropylene are preferred for use as the fluoroolefin (a) monomer and tetrafluoroethylene is particularly preferred. Representative examples of the nonfluorinated (b) monomers include ethylene, propylene, butylene, isobutylene and higher order α-olefins. Ethylene and propylene are preferred. Preferably, also, one of the above-described (a) or (b) monomers contain at least 3 carbon atoms. The most preferred fluoropolymer of this invention are copolymers of tetrafluoroethylene and propylene.

The above-described (a) and (b) monomers may also optionally be copolymerized with a small amount of (c) one or more monomers that produce an acidic hydrogen on the backbone of the resulting fluoropolymer. To preserve the chemical resistance of the fluoropolymer process aid, monomers that yield an acidic hydrogen within the structure of the fluoropolymer backbone are disfavored, and their presence must be minimized. Generally, monomers in which one vinyl carbon atom is perfluorinated (i.e. is saturated with fluorine atoms) and in which the other vinyl carbon atom contains at least one hydrogen atom will yield acidic hydrogen atoms on the backbone of a fluoropolymer into which they are polymerized, leaving the fluoropolymer susceptible to chemical attack by a base. This monomer class includes vinylidene fluoride, trifluoroethylene, 1-hydropentafluoropropene, and 2-hydropentafluoropropene. Monomers of this class are preferably not present in the fluoropolymer. If present, however, these monomers should not comprise greater than approximately 15 weight percent of the fluoropolymer, preferably comprising not more than 10 weight percent, even more preferably comprising less than 5 weight percent of the composition.

The fluoropolymer process aids of this invention are formed by copolymerizing one or more of the above-described fluorinated olefinic (a) monomers with one or more of the above-described (b) monomers, and optionally with a limited amount of one or of the above-described (c) monomer, such that the resulting process aid contains greater than 50 weight percent fluorine, preferably greater than 60 weight percent, even more preferably greater than 65 weight percent.

The fluoropolymers made in this manner from these constituent olefin monomers may be either semicrystalline or amorphous in nature, though the preferred fluoropolymer process aids are semicrystalline and can be easily pelleted.

The fluoropolymers should also contain essentially no ethylenic unsaturations because ethylenic unsaturations in the fluoropolymer may be sites for chemical attack by additives or other components present in the melt-processable composition. This means that the fluoropolymers will contain very little ethylenic unsaturation (e.g., carbon—carbon double bonds) along their backbone or in their pendant chains or groups. While very low levels of ethylenic unsaturation in the fluoropolymer process aid may be tolerated without substantial effect in this invention, higher levels cannot be tolerated without risking the chemical stability of its fluoropolymer process aid.

Fluoropolymers used in the invention should readily flow under the processing conditions of the thermoplastic hydrocarbon polymer into which it is admixed. In matching the fluoropolymer process aid with a thermoplastic hydrocarbon polymer, the fluoropolymer preferably should be chosen such that its melt viscosity matches or is about the same as the melt viscosity of the hydrocarbon polymer. For such matching, the fluoropolymer process aid can be selected such that the ratio of its melt viscosity to the melt viscosity of the thermoplastic hydrocarbon polymer is in the range of ratios from 0.01 to 100, more preferably in the range from 0.02 to 20, most preferably in the range between 0.05 and 5.

The fluorocarbon polymers used in accordance with this invention also preferably have an average molecular weight greater than about 10,000 and have a broad molecular weight distribution, and a polydispersity index (ratio of weight average molecular weight to number average molecular weight) of greater than about 1.5. These values generally correlate to fluoropolymer process aid Carreau-Yasuda Equation m1 values, as determined by the Dynamic Mechanical Analysis Evaluation described in Section I (C) of the Examples, of less than approximately 0.7. Preferably the polydispersity index of the fluoropolymer process aid is about 2 or more. This polydispersity index generally correlates to an m1 value of about 0.6 or less.

Preferred fluoropolymer process aids consist essentially of one or more fluoropolymers which consist essentially of interpolymerized units derived from:
(a) one or more monomers selected from the group consisting of tetrafluoroethylene and hexafluoropropylene, (b) one or more monomers selected from the group consisting of propylene and ethylene, and (c) from 0 to 10 wt. % of one or more monomers selected from the group consisting of vinylidene fluoride, trifluoroethylene, 1-hydropentafluoropropene and 2-hydropentafluoropropene. The weight percentages of tetrafluoroethylene, hexafluoropropylene, propylene, ethylene and monomer (c) used to make the fluoropolymers are selected such that the resulting weight percent of fluorine in the resulting fluoropolymer process aid is at least 50, and preferably is at least 65, weight percent of the process aid and the ratio of the melt viscosity of the fluoropolymer process aid to the melt viscosity of the thermoplastic hydrocarbon polymer or polymers is between 0.01 and 100.

These fluoropolymer process aids exhibit superior chemical resistance, particularly in the presence of a base. When exposed to an organic or inorganic base, the fluoropolymer process aids will not significantly degrade and will not suffer substantial diminution of their original properties. In comparison, fluoropolymers that chemically degrade in the presence of a base may notably change in appearance and may discolor when extruded in thermoplastic hydrocarbon polymers. The degree of chemical resistance of the fluoropolymer process aids of the invention may be measured, for example, by thermogravimetric analysis (TGA) techniques. Comparison of the weight loss obtained by TGA individually for a given fluoropolymer process aid and an organic basic additive with the weight loss obtained from the mixture of the two provides an indication of the degree of chemical reactivity of those components. Otherwise stated, a predicted weight loss for the component blend may be calculated from the average weight loss of the components measured individually (e.g., a simple arithmetic average of the two individual weight losses for equal weight blending of the two components). If no chemical activity occurs between the fluoropolymer process aid and the additive, the measured weight loss of their blend should equal their predicted weight loss, and the ratio of the measured to the predicted weight loss (hereinafter the "weight loss ratio") will be equal to 1. Significant chemical activity between the two components may release a measurable amount of gaseous product and the measured weight loss of the blend will be greater than that predicted for no chemical activity. In such a case, the weight loss ratio will be significantly greater than one. Using this measure of chemical resistance, the fluoropolymer process aids of the invention will have a weight loss ratio less than 1.75, preferably less than 1.25, when measured according to the method described above using TGA analysis at 275° C. for 30 minutes for a blend, in equal proportion by weight, of the fluoropolymer process aid with a hindered-amine light stabilizer (HALS).

The fluorinated polymers used in this invention may be made according to the method disclosed by U.S. Pat. No. 5,285,002 (Grootaert), whose description is incorporated herein by reference, wherein the polymerization reaction is carried out at about 50° C. or higher under free-radical conditions in an aqueous emulsion or suspension of a polymerizable mixture comprising the component (a) and (b) monomers, a fluoroaliphatic-radical containing sulfinate, and a suitable oxidizing agent.

The fluorocarbon process aids of this invention may also be combined with a poly(oxyalkylene) polymer component to further improve the extrusion characteristics of the thermoplastic hydrocarbon polymer. The poly(oxyalkylene) polymer component may comprise one or more poly(oxyalkylene) polymers, and a useful processing aid composition comprises, and preferably consists essentially of, between about 5 and 95 weight percent of the poly(oxyalkylene) polymer component and 95 and 5 weight percent of the fluoropolymer process aid. Typically, the ratio of the fluoropolymer process aid to the poly(oxyalkylene) polymer component in the processing aid will be from 1/2 to 2/1.

The poly(oxyalkylene) polymer component generally may comprise between about 0.005 and 20 weight percent of the overall melt-processable composition, more preferably between about 0.01 and 5 weight percent, and most preferably between about 0.02 and 1 weight percent.

Generally, poly(oxyalkylene) polymers useful in this invention include poly(oxyalkylene) polyols and their derivatives. A class of such poly(oxyalkylene) polymers may be represented by the general formula:

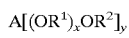

wherein:
A is an active hydrogen-free residue of a low molecular weight, initiator organic compound having a plurality of active hydrogen atoms (e.g., 2 or 3), such as a polyhydroxyalkane or a polyether polyol, e.g., ethylene glycol, glycerol, 1,1,1-trimethylol propane, and poly(oxypropylene) glycol;
y is 2 or 3;
$(OR^1)_x$ is a poly(oxyalkylene) chain having a plurality of oxyalkylene groups, $(OR^1)$, wherein the $R^1$ moieties can be the same or different and are selected from the group consisting of $C_1$ to $C_5$ alkylene radicals and, preferably, $C_2$ or $C_3$ alkylene radicals, and x is the number of oxyalkylene units in said chain. Said poly(oxyalkylene) chain can be a homopolymer chain, e.g., poly(oxyethylene) or poly(oxypropylene), or can be a chain of randomly distributed (i.e., a heteric mixture) oxyalkylene groups, e.g., a copolymer of —$OC_2H_4$— and —$OC_3H_6$— units, or can be a chain having alternating blocks or backbone segments of repeating oxyalkylene groups, e.g., a polymer comprising ―$(OC_2H_4)_a$― and ―$(OC_3H_6)_b$― blocks, wherein a+b=5 to 5000 or higher, and preferably 10 to 500.

$R^2$ is H or an organic radical, such as alkyl, aryl, or a combination thereof such as aralkyl or alkaryl, and may contain oxygen or nitrogen heteroatoms. For example, $R^2$ can be methyl, butyl, phenyl, benzyl, and acyl groups such as acetyl ($CH_3CO$—), benzoyl ($C_6H_5CO$—) and stearyl ($C_{17}H_{35}CO$—).

Representative poly(oxyalkylene) polymer derivatives can include poly(oxyalkylene) polyol derivatives wherein the terminal hydroxy groups have been partly or fully converted to ether derivatives, e.g., methoxy groups, or ester derivatives, e.g., stearate groups, ($C_{17}H_{35}COO$—). Other useful poly(oxyalkylene) derivatives are polyesters, e.g., prepared from dicarboxylic acids and poly(oxyalkylene) glycols. Preferably, the major proportion of the poly(oxyalkylene) polymer derivative by weight will be the repeating oxyalkylene groups, $(OR^1)$.

The poly(oxyalkylene) polyols and their derivatives can be those which are solid at room temperature and have a molecular weight of at least about 200 and preferably a molecular weight of about 400 to 20,000 or higher. Poly(oxyalkylene) polyols useful in this invention include polyethylene glycols which can be represented by the formula $H(OC_2H_4)_nOH$, where n is about 15 to 3000, such as those sold under the Carbowax trademark, such as Carbowax™ PEG 8000, where n is about 181, and those sold under the trade name Polyox, such as Polyox™ WSR N-10 where n is about 2272.

The blends of fluoropolymer and hydrocarbon polymer components (2) and (1), along with the poly(oxyalkylene) polymer component if present in the melt-processable composition, can be prepared by any of the blending means usually employed in the plastics industry, such as with a compounding mill, a Banbury mixer, or a mixing extruder in which the fluoropolymer process aid and poly(oxyalkylene) polymer component are uniformly distributed throughout the hydrocarbon polymer. The fluoropolymer process aid and the hydrocarbon polymers may be used in the form, for example, of powders, pellets, or granules. The mixing operation is most conveniently carried out at a temperature above the melting point of the hydrocarbon polymer, though it is also feasible to dry-blend the component in the solid state as particulates and then cause uniform distribution of the components by feeding the dry blend to a twin-screw melt extruder.

The resulting melt-blended mixture can be pelleted or otherwise comminuted into a desired particulate size or size distribution and fed to an extruder, which typically will be a single-screw extruder, that melt-processes the blended mixture. Melt-processing typically is performed at a temperature from 180° to 280° C., although optimum operating temperatures are selected depending upon the melting point, melt viscosity, and thermal stability of the blend. Different types of extruders that may be used to extrude the compositions of this invention are described, for example, by Rauwendaal, C., "Polymer Extrusion," Hansen Publishers, p. 23–48, 1986. The die design of an extruder can vary, depending on the desired extrudate to be fabricated. For example, an annular die can be used to extrude tubing, useful in making fuel line hose, such as that described in U.S. Pat. No. 5,284,184 (Noone et al.), which description is incorporated herein by reference.

Blends of the thermoplastic hydrocarbon and fluoropolymer process aid, along with the poly(oxyalkylene) polymer component, if present, may be compounded as a masterbatch in a hydrocarbon resin. The masterbatch subsequently may be diluted prior to melt-processing to effect a desired concentration of fluoropolymer process aid and poly (oxyalkylene) polymer component in the composition to be melt-processed. The fluoropolymer process aid and/or poly (oxyalkylene)polymer component alternatively may be fed to an extruder directly as a fine powder, therein combining with the thermoplastic hydrocarbon. The fluoropolymer process aid and/or poly(oxyalkylene) polymer component may be slurried or dissolved in a liquid and the resulting mixture may be blended with the hydrocarbon polymer to create a melt-processable composition. Such a slurrying technique may be particularly useful if the fluoropolymer or fluoropolymers employed are semicrystalline.

The blended composition can contain conventional adjuvants such as antioxidants, pigments, and fillers, e.g. titanium dioxide, carbon black, and silica.

The following examples are offered to aid in a better understanding of the present invention. These examples are not to be construed as an exhaustive compilation of all embodiments of the present invention and are not to be unnecessarily construed as limiting the scope of this invention.

EXAMPLES
I. FLUOROPOLYMER SYNTHESIS AND POLYMER PROPERTY EVALUATION

Thermal analysis of the polymers by differential scanning calorimetry (DSC) was performed on the following polymers using a TA Instruments DSC-2910 with a 2000 series controller and a LNCA-II controlled cooling accessory. Samples were heated to 350° C. and held isothermally for 1 min. to erase thermal history. Samples were then equilibrated at −100° C. Next, samples were heated at 10° C./min. from −100° C. to 350° C. Data was analyzed using TA Instruments DSC Analysis V4.0 software.

A. FLUOROPOLYMER SYNTHESIS AND PROPERTY EVALUATION

Fluoropolymer F1

A 19-liter vertically-stirred polymerization reactor was charged with 14,000 g deionized water, 9 g KOH, 81 g ammonium perfluoro octanoate (available from 3M as Fluorad™ FC-143 Surfactant), 50 g $K_2HPO_4$, and 324 g of a 20 wt % solution of $C_6F_{13}SO_2Na$ in deionized water. The reactor was then alternately evacuated and purged with $N_2$ until the $O_2$ level was less than 50 ppm. The reactor was then evacuated, the temperature raised to 71° C., and the agitation set at 445 rpm. Next, the reactor was charged with 578.4 g of tetrafluoroethylene (TFE) and 30.54 g of propylene to give a pressure of 2.02 MPa (293 psig). The polymerization was initiated by feeding a 10 wt % solution of $(NH_4)_2S_2O_8$ in deionized water to the reactor by means of a metering pump at approximately 3 g/min until 389 g of solution was fed. Upon the observation of a pressure drop, the running feed, which consisted of 75% TFE and 25% propylene, was started and continuously adjusted by the reactor's control system in order to maintain the desired pressure. The polymerization was halted by slowing the agitation after 2,998 g of TFE and 992 g of propylene had been fed. The reactor was then vented, cooled, and drained to isolate the latex. The resulting polymer was isolated by dripping the latex into a solution of magnesium chloride in water, followed by washing and drying, to yield a rubbery polymer.

Fluoropolymer F2

A 150-liter vertically-stirred polymerization reactor was charged with 120,000 g deionized water, 78 g KOH, 694 g ammonium perfluoro octanoate, 430 g $K_2HPO_4$, and 1,025 g of a 20% solution of $C_4F_9SO_2Na$ in deionized water. The reactor was then alternately evacuated and purged with $N_2$ until the $O_2$ level was less than 50 ppm. The reactor was then evacuated, the temperature raised to 71° C., and the agitation set at 210 rpm. Next, the reactor was charged with 3,549 g of TFE and 63.95 g of propylene to give a pressure of 1.52 MPa (220 psig). The polymerization was initiated by feeding a 5% solution of $(NH_4)_2S_2O_8$ in deionized water to the reactor by means of a metering pump at approximately 25 g/min until one equivalent of $(NH_4)_2S_2O_8$ was fed (approximately 3,200 g of solution). Upon the observation of a pressure drop, the running feed, which consisted of 92% TFE and 8% propylene, was started and continuously adjusted by the reactor's control system in order to maintain the desired pressure. The polymerization was halted by slowing the agitation after 31,096 g of TFE and 2,704 g of propylene had been fed. The reactor was then vented, cooled, and drained to isolate the latex. The resulting polymer was coagulated by adding HCl to the latex, granulated, washed six times with deionized water, and dried overnight in an oven at 120° C. to yield a thermoplastic polymer in a white granular form. The polymer exhibited a melting endotherm with a peak melting temperature ($T_m$) of 193° C., when analyzed using differential scanning calorimetry (DSC).

Fluoropolymer F3

A 150-liter vertically-stirred polymerization reactor was charged with 105,000 g deionized water, 68 g KOH, 607 g ammonium perfluoro octanoate, 376 g $K_2HPO_4$, and 1,790 g of a 20% solution of $C_4F_9SO_2Na$ in deionized water. The reactor was then alternately evacuated and purged with $N_2$ until the $O_2$ level was less than 50 ppm. The reactor was then evacuated, the temperature raised to 71° C., and the agitation set at 210 rpm. Next, the reactor was charged with 3,386 g of TFE, 886 g of vinylidene fluoride ($VF_2$), and 88 g of propylene to give a pressure of 1.60 MPa (232 psig). The polymerization was initiated by feeding a 10% solution of $(NH_4)_2S_2O_8$ in deionized water to the reactor by means of a metering pump at approximately 25 g/min until 2,800 g of $(NH_4)_2S_2O_8$ solution was fed. Upon the observation of a pressure drop, the running feed, which consisted of 70% TFE, 10% vinylidene fluoride, and 20% propylene, was started and continuously adjusted by the reactor's control system in order to maintain the desired pressure. The polymerization was halted by slowing the agitation after 21,000 g of TFE, 3,000 g of vinylidene fluoride, and 6,000 g of propylene had been fed. The reactor was then vented, cooled, and drained to isolate the latex. The resulting polymer was isolated by dripping the latex into a solution of magnesium chloride in water, followed by washing and drying, to yield a rubbery polymer.

Fluoropolymer F4

An 86-liter vertically-stirred polymerization reactor was charged with 52,000 g deionized water, 140 g KOH, 300 g ammonium perfluoro octanoate, 55.2 g $Na_2SO_3$, 2 g $CuSO_4 \cdot 5H_2O$, and 1,000 g of a 20% solution of $C_6F_{13}SO_2Na$ in deionized water. The reactor was then alternately evacuated and purged with $N_2$ until the $O_2$ level was less than 50 ppm. The reactor was then evacuated, the temperature raised to 54° C., and the agitation set at 150 rpm. Next, the reactor was charged with 1,256 g of TFE and 37.18 g of propylene to give a pressure of 0.83 MPa (120 psig). The polymerization was initiated by feeding a 10% solution of $(NH_4)_2S_2O_8$ in deionized water to the reactor by means of a metering pump at approximately 3 g/min until 778 g of solution was fed. Upon the observation of a pressure drop, the running feed, which consisted of 88% TFE and 12% propylene, was started and continuously adjusted by the reactor's control system in order to maintain the desired pressure. The polymerization was halted by slowing the agitation to 30 rpm after 7,824 g of TFE and 1,080 g of propylene had been fed. The reactor was then vented, cooled, and drained to isolate the latex. The resulting polymer was isolated by freeze coagulation, washed six times with hot deionized water, and dried overnight in an oven at 100° C. to yield a thermoplastic polymer in a white granular form. The polymer exhibited a melting endotherm with a peak melting temperature ($T_m$) of 103° C., when analyzed using differential scanning calorimetry (DSC).

Fluoropolymer F5

A 150-liter vertically-stirred polymerization reactor was charged with 120,000 g deionized water, 78 g KOH, 694 g ammonium perfluoro octanoate, 430 g $K_2HPO_4$, and 1,025 g of a 20% solution of $C_4F_9SO_2Na$ in deionized water. The reactor was then alternately evacuated and purged with $N_2$ until the $O_2$ level was less than 50 ppm. The reactor was then evacuated, the temperature raised to 71° C., and the agitation set at 210 rpm. Next, the reactor was charged with 3,730 g of TFE and 76.14 g of propylene to give a pressure of 1.52 MPa (220 psig). The polymerization was initiated by feeding a 5% solution of $(NH_4)_2S_2O_8$ in deionized water to the reactor by means of a metering pump at approximately 25 g/min until one equivalent of $(NH_4)_2S_2O_8$ was fed (approximately 3,200 g of solution). Upon the observation of a pressure drop, the running feed, which consisted of 88% TFE and 12% propylene, was started and continuously adjusted by the reactor's control system in order to maintain the desired pressure. The polymerization was halted by slowing the agitation after 28,424 g of TFE and 3,876 g of propylene had been fed. The reactor was then vented, cooled, and drained to isolate the latex. The resulting polymer was coagulated by adding HCl to the latex, granulated, washed six times with deionized water, and dried overnight in an oven at 120° C. to yield a thermoplastic polymer in a white granular form. The polymer exhibited a melting endotherm with a peak melting temperature ($T_m$) of 116° C. and an end of melting temperature of 175° C., when analyzed using differential scanning calorimetry (DSC).

Fluoropolymer F6

An 86-liter vertically-stirred polymerization reactor was charged with 45,000 g deionized water, 29 g KOH, 260 g ammonium perfluoro octanoate, 161 g $K_2HPO_4$, and 1,300 g of a 20% solution Of $C_6F_{13}SO_2Na$ in deionized water. The reactor was then alternately evacuated and purged with $N_2$ until the $O_2$ level was less than 50 ppm. The reactor was then evacuated, the temperature raised to 71° C., and the agitation set at 150 rpm. Next, the reactor was charged with 2,246 g of TFE and 47.41 g of propylene to give a pressure of 1.38 MPa (200 psig). The polymerization was initiated by feeding a 10% solution of $(NH_4)_2S_2O_8$ in deionized water to the reactor by means of a metering pump at approximately 7 g/min until 1,200 g of solution was fed. Upon the observation of a pressure drop, the running feed, which consisted of 91% TFE and 9% propylene, was started and continuously adjusted by the reactor's control system in order to maintain the desired pressure. The polymerization was halted by slowing the agitation after 18,266 g of TFE and 1,824 g of propylene had been fed. The reactor was then vented, cooled, and drained to isolate the latex. The resulting polymer was isolated by freeze coagulation, washed six times with hot deionized water, and dried overnight in an oven at 100° C. to yield a thermoplastic polymer in a white granular form. The polymer exhibited a melting endotherm with a peak melting temperature ($T_m$) of 130° C., when analyzed using differential scanning calorimetry (DSC).

Fluoropolymer F7

An 86-liter vertically-stirred polymerization reactor was charged with 45,000 g deionized water, 29 g KOH, 260 g ammonium perfluoro octanoate, 161 g $K_2HPO_4$, and 1,300 g of a 20% solution of $C_6F_{13}SO_2Na$ in deionized water. The reactor was then alternately evacuated and purged with $N_2$ until the $O_2$ level was less than 50 ppm. The reactor was then evacuated, the temperature raised to 71° C., and the agitation set at 150 rpm. Next, the reactor was charged with 869.2 g of TFE and 019.32 g of propylene to give a pressure of 0.55 MPa (80 psig). The polymerization was initiated by feeding a 10% solution of $(NH_4)_2S_2O_8$ in deionized water to the reactor by means of a metering pump at approximately 7 g/min until 1,200 g of solution was fed. Upon the observation of a pressure drop, the running feed, which consisted of 91% TFE and 9% propylene, was started and continuously adjusted by the reactor's control system in order to maintain the desired pressure. The polymerization was halted by slowing the agitation after 7,459 g of TFE and 754.3 g of propylene had been fed. The reactor was then vented, cooled, and drained to isolate the latex. The resulting polymer was isolated by freeze coagulation, washed six times with hot deionized water, and dried overnight in an oven at 100° C. to yield a thermoplastic polymer in a white granular form. The polymer exhibited a melting endotherm with a peak melting temperature ($T_m$) of 68° C., when analyzed using differential scanning calorimetry (DSC).

Fluoropolymer F8

An 86-liter vertically-stirred polymerization reactor was charged with 45,000 g deionized water, 29 g KOH, 260 g ammonium perfluoro octanoate, 161 g $K_2HPO_4$, and 1,300 g of a 20% solution of $C_6F_{13}SO_2Na$ in deionized water. The reactor was then alternately evacuated and purged with $N_2$ until the $O_2$ level was less than 50 ppm. The reactor was then evacuated, after which 100 g of hexamethyl disilane was added by injection. The temperature was then raised to 71° C., and the agitation set at 150 rpm. Next, the reactor was charged with 2,006 g of TFE and 42.73 g of propylene to give a pressure of 1.24 MPa (180 psig). The polymerization was initiated by feeding a 20% solution of $(NH_4)_2S_2O_8$ in deionized water to the reactor by means of a metering pump at approximately 7 g/min until 644 g of solution was fed. Upon the observation of a pressure drop, the running feed, which consisted of 91% TFE and 9% propylene, was started and continuously adjusted by the reactor's control system in order to maintain the desired pressure. The polymerization was halted by slowing the agitation after 18,330 g of TFE and 1,833 g of propylene had been fed. The reactor was then vented, cooled, and drained to isolate the latex. The resulting polymer was isolated by freeze coagulation, washed six times with hot deionized water, and dried overnight in an oven at 100° C. to yield a thermoplastic polymer in a white granular form. The polymer exhibited a melting endotherm with a peak melting temperature ($T_m$) of 123° C., when analyzed using differential scanning calorimetry (DSC).

Comparative Fluoropolymer V10

A 4-liter vertically-stirred polymerization reactor was charged with 2,600 g deionized water, 7 g KOH, 15 g ammonium perfluoro octanoate, 5.6 g $Na_2SO_3$, 0.1 g $CuSO_4 \cdot 5 H_2O$, and 68 g of a 20% solution of $C_6F_{13}SO_2Na$ in deionized water. The reactor was then alternately evacuated and purged with $N_2$ until the $O_2$ level was less than 50 ppm. The reactor was then evacuated, the temperature raised to 54° C., and the agitation set at 550 rpm. Next, the reactor was charged with 138.2 g of TFE and 7.17 g of propylene to give a pressure of 1.87 MPa (270 psig). The polymerization was initiated by feeding a 5% solution of $(NH_4)_2S_2O_8$ in deionized water to the reactor by means of a metering pump at approximately 0.5 g/min until 130 g of solution was fed. Upon the observation of a pressure drop, the running feed, which consisted of 75% TFE and 25% propylene, was started and continuously adjusted by the reactor's control system in order to maintain the desired pressure. The polymerization was halted by slowing the agitation to 60 rpm after 652.3 g of TFE and 220.4 g of propylene had been fed. The reactor was then vented, cooled, and drained to isolate the latex. The resulting polymer was isolated by dripping the latex into a solution of magnesium chloride in water, followed by washing and drying, to yield a rubbery polymer.

Comparative Fluoropolymer V11

An 86-liter vertically-stirred polymerization reactor was charged with 52,000 g deionized water, 300 g NaOH, 300 g ammonium perfluoro octanoate, 55.2 g $Na_2SO_3$, 2 g $CuSO_4 \cdot 5\ H_2O$, and 191 g of a 70% solution of $C_4F_9SO_2Na$ in deionized water. The reactor was then alternately evacuated and purged with $N_2$ until the $O_2$ level was less than 50 ppm. The reactor was then evacuated, the temperature raised to 52° C., and the agitation set at 150 rpm. Next, the reactor was charged with 2,298 g of TFE and 65.71 g of propylene to give a pressure of 1.52 MPa (220 psig). The polymerization was initiated by feeding a 10% solution of $(NH_4)_2S_2O_8$ in deionized water to the reactor by means of a metering pump at approximately 8 g/min until 1,000 g of solution was fed. Upon the observation of a pressure drop, the running feed, which consisted of 88% TFE and 12% propylene, was started and continuously adjusted by the reactor's control system in order to maintain the desired pressure. The polymerization was halted by slowing the agitation to 30 rpm after 5,130 g of TFE and 715.2 g of propylene had been fed. The reactor was then vented, cooled, and drained to isolate the latex. The resulting polymer was isolated by freeze coagulation, washed five times with hot deionized water, and dried overnight in an oven at 100° C. to yield a thermoplastic polymer in a white granular form. The polymer exhibited a melting endotherm with a peak melting temperature ($T_m$) of 80° C., when analyzed using differential scanning calorimetry (DSC).

TABLE 1

| | | Monomer Composition (wt %) | | | | Polymer Composition (wt %) | |
|---|---|---|---|---|---|---|---|
| | Fluoropolymer | TFE | P | $VF_2$ | HFP | H | F |
| V1 | Fluorel ™ FC-2145 | — | — | 60 | 40 | 1.88 | 66.0 |
| V2 | Dynamar ™ FX-9613 | — | — | 60 | 40 | 1.88 | 66.0 |
| V3 | experimental | — | — | 60 | 40 | 1.88 | 66.0 |
| V4 | THV-500G | 60 | — | 20 | 20 | 0.63 | 72.7 |
| V5 | Fluorel ™ FX-11705 | 54 | 15 | 32 | — | 3.14 | 60.0 |
| V6 | Aflas ™ 100N | 75 | 25 | — | — | 3.57 | 57.0 |
| V7 | experimental | 75 | 25 | — | — | 3.57 | 57.0 |
| V8 | Aflas ™ 150C | 75 | 25 | — | — | 3.57 | 57.0 |
| V9 | Aflas ™ 150L | 75 | 25 | — | — | * | * |
| V10 | experimental | 75 | 25 | — | — | 3.57 | 57.0 |
| V11 | experimental | 88 | 12 | — | — | 1.71 | 66.9 |
| F1 | experimental | 75 | 25 | — | — | 3.57 | 57.0 |
| F2 | experimental | 92 | 8 | — | — | 1.14 | 69.9 |
| F3 | experimental | 70 | 20 | 10 | — | 3.17 | 59.1 |
| F4 | experimental | 88 | 12 | — | — | 1.71 | 66.9 |
| F5 | experimental | 88 | 12 | — | — | 1.71 | 66.9 |
| F6 | experimental | 91 | 9 | — | — | 1.29 | 69.2 |
| F7 | experimental | 91 | 9 | — | — | 1.29 | 69.2 |
| F8 | experimental | 91 | 9 | — | — | 1.29 | 69.2 |
| F9 | experimental | | | not measured | | | |

*Aflas ™ 150L is produced by a thermal treatment of Aflas ™ 150C. The thermal treatment removes hydrogen and fluorine from polymer backbone to yield carbon to carbon double bonds. The resultant polymer is black in color. The thermal treatment is believed to reduce the Mooney viscosity through chain scission.
Sources*
V1: 3M Company
V2: 3M Company, 90% fluoroelastomer, 6% talc, 2% $CaCO_3$ and 2% $SiO_2$
V3: Same composition as V1, but polymerized according to method described in Example 3 of U.S. Pat. No. 5,285,002 (Grootaert).
V4: 3M Company, formerly available from Hoechst as Hostaflon ™ TFBX-7100.
V5: Distributed by 3M Company
V6: Asahi Glass Company
V7: Sample polymerized according to method described in Example 5 of U.S. Pat. No. 4,463,144.
V8: Asahi Glass Company, lowest known viscosity of commercially available TFE/P polymers.
V9: Asahi Glass Company
F9: Experimental product from Hoechst, ET 6810, polymer containing Ethylene, TFE & HFP, with a Tm peak of 160° C.
*V10, V11 and F1–F8 made as previously described
Monomers
TFE: Tetrafluoroethylene
P: Propylene
$VF_2$: Vinylidene fluoride
HFP: Hexafluoropropylene
H: Hydrogen
F: Fluorine

B. DESCRIPTION OF THE POLYETHYLENES USED IN THE EXAMPLES.

TABLE 2

Commercial Polyethylenes

| Resin | Product Code | Company | MI | Comonomer | Density | Form |
|---|---|---|---|---|---|---|
| A | LL-1001.32 | Exxon Chem. | 1.0 | 1-Butene | 0.917 | pellets |
| B | LL-1001.09 | Exxon Chem. | 1.0 | 1-Butene | 0.917 | powder |
| C | LL-3201.00 | Exxon Chem. | 0.8 | 1-Hexene | 0.925 | powder |
| D | TFY826F | Novacor Chem., Ltd. | 0.8 | 1-Hexene | 0.926 | pellets |
| E | DMDA-6147 | Petromont, Inc. | 8* | 1-Hexene | 0.945 | pellets |

MI: Determined in accordance with ASTM D-1238, melt index at 190° C. with a load of 2.16 kg.

TABLE 2-continued

Commercial Polyethylenes

| Resin Product Code | Company | MI | Comonomer | Density | Form |
| --- | --- | --- | --- | --- | --- |

*HLMI, high load melt index at 190° C. with a load of 21.6 kg
Density: grams/cm$^3$

C. DYNAMIC MECHANICAL ANALYSIS EVALUATION OF FLUOROPOLYMER PROPERTIES

A Rheometrics Mechanical Spectrometer (RMS) model RDA II was used to conduct Dynamic Mechanical Analysis (DMA) and determine various viscoelastic properties of the polymers listed in Tables 1 and 2. Samples for testing were first molded into a 1 mm thick plaque, using a Carver press. Samples were pressed at a minimum temperature of 150° C. for about a minute and at a pressure sufficient to produce a uniform plaque thickness. Higher temperatures and longer press times were used if the sample did not flow sufficiently. A 25.4 mm circular sample was then cut from the plaque using a circular punch.

Measurements were conducted in the molten state, using parallel plates with a radius of 12.5 mm and a gap of about 0.75 mm. For each sample, isothermal frequency sweeps were run at four to six different test temperatures between the range of 170° C. and 340° C. The validity of the results was verified using a Cole—Cole plot and unreliable data were rejected. For each sample, the results from at least four temperatures were used for further calculations.

The viscosity data were fitted to the Carreau-Yasuda (ref 1,2,3) Equation (Equation 1), using the Marquardt-Levenberg Algorithm (ref 4), as obtained from Jandel Scientific. Since the voltage output of the torque transducer of the RMS instrument is proportional to the logarithm of the torque, and in order to give an equivalent statistical weight to lower and higher viscosities, the logarithmic form in Equation 1 was used:

$$\log (\eta) = \log (\eta_0) - (((1-n)/m1) \log (1+(\omega\tau)^{m1})) \quad 1)$$

Where: ($\eta$) is the viscosity of the molten polymer, ($\eta_0$) is the zero shear viscosity, ($\tau$) is the relaxation time and ($\omega$) is the frequency. In this equation, n is the power law exponent and is an indicator of the slope of the curve in the pseudoplastic region; while m1 is a relative scale of the molecular weight distribution (MWD), with large values of m1 corresponding to narrower molecular weight distributions.

The time-temperature superposition principle was applied here by combining Equation 1 with Equations 2, 3 and 4. The time-temperature superposition principle allows measurements made at a given temperature to be shifted to a reference temperature using a shift factor (at), which is described below:

$$\log (at) = (\Delta H_a/2.3R)(1/T - 1/T_r) \quad 2)$$

Where $\Delta H_a$ is the activation energy of the polymer flow, R is the gas constant, T is the temperature and $T_r$ is the reference temperature, in Kelvin.

This Equation is considered valid at the testing temperatures considered here (ref 5). Although $T_g$, the glass transition temperature, is often used as the reference temperature, Equation 2 remains valid with any reference temperature. Also, the activation energy, $\Delta H_a$, is considered constant over the temperature ranges considered here.

The zero shear viscosity and relaxation time at a specific temperature can be obtained from Equations 3 and 4:

$$\log (\eta_0) = \log (\eta_r) + \log (at) \quad 3)$$

$$\log (\tau) = \log (\tau_r) + \log (at) \quad 4)$$

Where $\eta_r$ and $\tau_r$ are the zero shear viscosity and the relaxation time respectively at the reference temperature.

In some cases it was not always possible to obtain a measurement at the reference temperature of 190° C., particularly if the sample was not fully molten, or if the viscosity was near the limit of the transducer accuracy. However, the log ($\eta_0$) and log ($\tau$) can be extrapolated to the reference temperature for comparison purposes. Equations 2 through 4 can be used to convert the results from one reference temperature to another.

This set of equations, 1 through 4, was fitted simultaneously to the $\eta'$ and $\eta^*$ curves obtained from the DMA measurements. The Carreau-Yasuda Equation was used to fit the true and complex viscosity data, where $\eta'$ is the true viscosity and $\eta^*$ is the complex viscosity. The n' parameter for the $\eta'$ curve will be different from the n* parameter for the $\eta^*$ curve. However, in the equations used here, the values of $\eta_0$, $\tau$ and m1 are equivalent for both curves, these variables are characteristics of the molecular weight and molecular weight distribution.

The polymers listed in Tables 1 and 2 were tested as described, and the measured experimental data was fitted to Equations 1 through 4 using a reference temperature of 190° C. in each case. The six constants: m1, n', n*, log ($\eta_r$), log ($\tau_r$) and $\Delta H_a$ were used as the fitting parameters. A value of n*$\geq$0 was used as a constraint in the calculations, since a value smaller than zero is unrealistic. The parameters are listed in Table 3.

The polydispersity of the samples were assessed from the curve-fitting parameters. The curvature of the viscosity curve with shear rate or angular frequency can be associated with polydispersity (ref 6). The m1 parameter is a measurement of the curvature of the viscosity curve and can be associated with polydispersity (ref 7). Therefore, the parameter m1 was used as a scale of polydispersity. Values of m1 of about 0.7 or more are taken here to correspond to relatively narrow molecular weight distributions (an m1 value of about 0.6 is believed to correspond to a polydispersity of roughly 2), while m1 values around 0.35 are representative of broader molecular weight distribution samples. References (all incorporated herein by reference) 1. P. J. Carreau, Trans. Soc. Rheol., 16, 99, (1972) 2. K. Y. Yasuda, R. C. Armstrong and R. E. Cohen, Rheol. Acta, 20, 163, (1981) 3. L. A. Utracki and B. Schlund, Polym. Eng. Sci., 27, 367, (1987) 4. D. W. Marquardt, J. Soc. Indust. Appl. Math., 11, 431, (1983) 5. H. A. Schneider, M. J. Brekner and H. J. Cantow, Polym. Bull., 14, 479, (1985) 6. M. Fleissner, Makromol. Chem., Macromol. Symp., 61, 324, (1992) 7. K. Bernreitner; W. Neissl, Polymer Testing 11, 89, (1992)

TABLE 3

Viscoelastic Properties

| Material | ML | log ($\eta_o$) | log ($\tau$) | m1 | $\Delta H_a$ | n |
|---|---|---|---|---|---|---|
| A | — | 5.13 | −1.67 | 0.49 | 27 | 0.15 |
| D | — | 5.28 | −1.52 | 0.43 | 24 | 0.14 |
| E | — | 7.35 | 1.18 | 0.21 | 15.2 | 0.21 |
| V1 | 32 | 5.44 | −0.17 | 0.37 | 61 | 0.29 |
| V2 | 32 | ** | — | — | — | — |
| V3 | 32 | ** | — | — | — | — |
| V4 | — | 5.54 | −1.40 | 0.59 | 52 | 0.09 |
| V5 | 46 | 7.5* | 1.3 | 0.20 | 50 | 0.16 |
| V6 | 150+ | 9.97* | 4.13 | 0.17 | 66 | 0.17 |
| V7 | 121 | 10** | — | — | — | — |
| V8 | 100+ | 10.37* | 4.74 | 0.15 | 78 | 0.20 |
| V9 | 25 | 5.77 | −0.87 | 0.19 | 56 | 0.13 |
| V10 | 68 | 7.76 | 2.29 | 0.35 | 29 | 0.22 |
| V11 | — | 6.19 | 2.40 | 1.22 | 86 | 0.56 |
| F1 | 25 | 5.42 | 0.33 | 0.39 | 44 | 0.37 |
| F2 | — | 7.27 | 1.52 | 0.41 | 132 | 0.32 |
| F3 | 50 | 7.16 | 1.94 | 0.37 | 91 | 0.28 |
| F4 | — | 4.62 | −1.04 | 0.68 | 128 | 0.27 |
| F5 | — | 6.89 | 1.10 | 0.31 | 96 | 0.30 |
| F6 | — | 6.19 | 0.14 | 0.37 | 98 | 0.14 |
| F7 | — | 4.16 | −1.21 | 0.61 | 102 | 0.36 |
| F8 | — | 4.60 | −2.01 | 0.32 | 29 | 0 |
| F9 | — | 7.38 | 2.14 | 0.43 | 83 | 0.45 |

ML: Mooney viscosity, ASTM D1646, condition ML 1 + 10 minutes, measured at 121° C. Not tested on semi-crystalline materials.
log ($\eta_o$): log of the zero shear viscosity at 190° C., in poise.
log ($\tau$): log of the relaxation time of the polymer at 190° C., in seconds
m1: measurement of the curvature of the viscosity curve; m1 is inversely proportional to polydispersity.
$\Delta H_a$: activation energy of flow in kJ/mol
n: power law index
*Results are near the upper torque and accuracy limit of the DMA viscometer
**Estimated value, not measured. The viscoelastic properties of V7 is taken to be within the range of properties of V6 and V8 given its measured Mooney viscosity is within this range. The viscoelastic properties of V2 and V3 were not measured, but are taken to be similar to that of V1 given they have the same Mooney viscosity.

D. ANALYSIS OF MELT-PROCESSABLE COMPOSITIONS AND THEIR COMPONENTS USING THERMO-GRAVIMETRIC ANALYSIS

Comparative Example C1

Step A: A sample of Chimassorb™ 944, hindered amine light stabilizer (HALS, from Ciba-Geigy) was placed in a Perkin Elmer TGA (thermo-gravimetric analyzer) and evaluated in air. The temperature was ramped from 30° C. to 275° C. at 200° C./minute and then held at 275° C. for 30 minutes. After 30 minutes, the sample had lost 5.012% of its weight and was brown in color throughout.

Step B: A sample of fluoropolymer V1, described in Table 1, was tested under the same conditions as the HALS in Step A. The sample lost 0.479% of its weight after 30 minutes.

Step C: 25 grams of V1 was blended at ambient conditions with an equal amount of the HALS used in Step A using a Thropp™ 7.62 cm (3 inch) two-roll mill. A portion of this blend was tested in the TGA under the same conditions as the HALS in Step A. The sample was removed after testing and examined for discoloration both on its surface and interior by cutting it in half. The weight losses of the HALS measured in Step A and V1 in Step B were averaged to predict a weight loss value for the milled two component blend. The results are listed in Table 4.

EXAMPLE 1

Step A: A sample of fluoropolymer F1 was tested in the TGA under the same conditions as fluoropolymer V1 in Step B of Comparative Example C1 and lost 0.539% of its weight after 30 minutes.

Step B: A blend was prepared and evaluated according to the procedure described in Step C of Comparative Example C1 except that fluoropolymer F1 was used in place of V1. The results are listed in Table 4.

TABLE 4

TGA results, 30 minutes at 275° C., in air

| Example | 50/50 Blend | Measured % Wt loss | Predicted* % Wt loss | Weight Loss Ratio** |
|---|---|---|---|---|
| C1 | V1 & HALS | 6.106 | 2.746 | 2.22 |
| 1 | F1 & HALS | 2.384 | 2.776 | 0.86 |

| | | Color before TGA*** | | Color after TGA | |
|---|---|---|---|---|---|
| Example | 50/50 Blend | initial | 10 months | outside | inside |
| C1 | V1 & HALS | white | tan | black | black |
| 1 | F1 & HALS | white | white | brown | white |

Size of TGA test samples ranged from 8 to 12 mg.
*Predicted weight loss based on average weight loss of the individual components used to make the 50/50 milled blend.
**Ratio is the actual measured loss divided by the predicted weight loss. A weight loss ratio of 1.0 indicates the sample is losing the predicted amount. A ratio greater than 1.0 indicates a decrease in thermal stability, most probably due to chemical reaction between blend components. A ratio of less than 1.0 is interpreted as non-reactive, this may occur if the volatiles from either individual component become trapped within the blend matrix.
***Color of milled blend when initially made, and after 10 months at ambient conditions. Comparative Example C1 showed discoloration after 10 days at ambient.

The results show that fluoropolymer F1 has better chemical resistance than V1 in the presence of reactive additives such as HALS. The TGA measured weight loss of Comparative Example C1 was greater than the predicted weight loss, which indicates a decrease in thermal stability. Also, the color of Comparative Example C1 changed from white to black throughout, a further indication of chemical interaction between the two components. Finally, Comparative Example C1 also showed discoloration at ambient conditions over time, this is taken to indicate chemical interaction with the HALS. This demonstrates that polymers of the V1-type are susceptible to chemical reaction even while at ambient conditions.

In contrast, Example 1 had a weight loss less than what was predicted, indicating no loss in stability with temperature. Likewise, it retained its original white color on the inside. The brown outer surface is believed to be due to HALS on the outer surface of the blend discoloring to the same brown color that the HALS exhibits when tested alone. Even though fluoropolymer F1 contains nearly twice the weight % hydrogen as fluoropolymer V1 (Table 1), it is non-reactive in comparison. The blend of fluoropolymer F1 and HALS showed no change in color over time at ambient conditions.

Comparative Example C2

Step A: A sample of HALS was placed in a TGA and evaluated under the same conditions as the HALS evaluated in Step A of Comparative Example C1. The sample lost 3.817% of its weight after 30 minutes and was brown in color throughout.

Step B: A sample of fluoropolymer V3 was evaluated in the TGA under the same conditions as the fluoropolymer evaluated in Step B of Comparative Example C1 and lost 0.394% of its weight.

Step C: 25 grams of fluoropolymer V3 was blended at ambient conditions with an equal amount of the HALS used in Step A using a Thropp™ 7.62 cm two-roll mill. A portion of this blend was tested in the TGA under the same conditions as the blend evaluated in Step C of Comparative Example C1. The weight losses measured for the individual components in Steps A and B of this Example were averaged to predict a weight loss value for the milled two component blend. The results are listed in Table 5.

Comparative Example C3

Step A: A sample of fluoropolymer V5 was evaluated in the TGA under the same conditions as the fluoropolymer evaluated in Step B of Comparative Example C1, the sample lost 0.502% of its weight after 30 minutes.

Step B: A blend was prepared and evaluated using the procedures described in Comparative Example C2 except that fluoropolymer V5 was used in place of fluoropolymer V3. The results are listed in Table 5.

Example 2

Step A: A sample of HALS was placed in a TGA and evaluated under the same conditions as the HALS evaluated in Step A of Comparative Example C1. The sample lost 2.595% of its weight after 30 minutes and was brown in color throughout.

Step B: A sample of fluoropolymer F3 was evaluated in the TGA under the same conditions as the fluoropolymer evaluated in Step B or Comparative Example C1, the sample lost 0.362% of its weight after 30 minutes.

Step C: 25 grams of fluoropolymer F3 was blended at ambient conditions with an equal amount of the HALS used in Step B using a Thropp™ 3 inch two-roll mill. A portion of this blend was tested in the TGA under the same conditions as the blend evaluated in Step C of Comparative Example C1. The weight losses measured for the individual components in Steps A and B of this example were averaged to predict a weight loss value for the milled two component blend. The results are listed in Table 5.

TABLE 5

TGA results, 30 minutes at 275° C., in air

| Example | 50/50 Blend | Measured % Wt loss | Predicted* % Wt loss | Weight Loss Ratio** |
|---|---|---|---|---|
| C2 | V3 & HALS | 7.469 | 2.106 | 3.55 |
| C3 | V5 & HALS | 3.876 | 2.160 | 1.79 |
| 2 | F3 & HALS | 2.429 | 1.479 | 1.64 |

| | | Color before TGA*** | | Color after TGA | |
|---|---|---|---|---|---|
| Example | 50/50 Blend | initial | 10 months | outside | inside |
| C2 | V3 & HALS | white | tan | black | black |
| C3 | V5 & HALS | white | white | brown | tan |
| 2 | F3 & HALS | white | white | brown | tan |

*Predicted weight loss based on average weight loss of the individual components used to make the 50/50 milled blend.
**Ratio is of the actual measured loss divided by the predicted weight loss.
***Color of milled blend when initially made, and after one month at ambient conditions. Comparative Example C2 began to show discoloration after 4 days at ambient.

Comparative Example C2 showed a weight loss greater than that predicted from the average of the individual components used to make the blend. Also, its color changed from white to black throughout, a further indication of reaction. Finally, the color of Comparative Example C2 changed overtime, even while at ambient conditions. Comparative Example C3 had a weight loss greater than that predicted. The surface of this sample was brown, as was the pure HALS, and its interior changed from white to tan. Example 2 also had a weight loss greater than predicted, but its loss ratio was smaller than that of sample C3. The surface of Example 2 was brown like the pure HALS, and the interior changed from white to tan. This again indicates that the inclusion of $VF_2$ increases the reactivity of the fluoropolymer, and demonstrates a relation between reactivity and the amount of this (c) monomer in a fluoropolymer. The sample of Example 2 showed no change in color at ambient conditions. While the change in color and increased weight loss indicated a reaction with the HALS, the inclusion of a smaller amount of $VF_2$ in fluoropolymer F3 in Example 2 was not as reactive as the fluoropolymer V5 in Comparative Example C3.

The reactivity and weight loss ratios of the fluoropolymers blended with HALS in these examples is inversely related to the % hydrogen in the fluoropolymer (as listed in Table 1). This indicates that the amount of hydrogen contained in a fluoropolymer is not as important as the type of monomers used.

Comparative Example C4

Step A: A sample of fluoropolymer V4 was tested in the TGA under the same conditions as the fluoropolymer evaluated in Step B of Comparative Example C1. The sample lost 0.090% of its weight after 30 minutes.

Step B: 64 grams of fluoropolymer V4 and 16 grams of the HALS used in Step A of Comparative Example C1 were melt mixed in a Haake Rheocord™ System 90 using a Rheomix™ 600 bowl fitted with roller blades. The mixing sequence lasted for five minutes at a constant temperature of 220° C. The rotors were programmed in the following sequence; 15 rpm for the first two minutes, then increased to 50 rpm during the third minute and held at 50 rpm for the duration. A portion of the blend was tested in the TGA under the same conditions as the blend evaluated in Step C of Comparative Example C1. The HALS TGA weight loss measured in Step A of Comparative Example C1 and the fluoropolymer TGA weight loss measured in Step A were averaged to predict a weight loss for the melt mixed blend. The results are listed in Table 6.

Example 3

Step A: A sample of fluoropolymer F5 was tested in the TGA under the same conditions as the fluoropolymer evaluated in Step B of Comparative Example C1. The sample lost 0.102% of its weight after 30 minutes.

Step B: A blend of fluoropolymer F5 and HALS was prepared and evaluated using the procedure described in Step B of Comparative Example C4. The HALS TGA weight loss measured in Step A of Comparative Example C1 and the TGA weight loss for F5 measured in Step A were averaged to predict a weight loss for the melt mixed blend. The results are listed in Table 6.

Example 4

Step A: A sample of fluoropolymer F9 was tested under the same conditions as the fluoropolymer evaluated in Step B of Comparative Example 1. The sample lost 0.214% of its weight after 30 minutes.

Step B: A blend of fluoropolymer F9 and HALS was prepared and evaluated using the procedure described in Comparative Example C4. The HALS TGA weight loss measured in Step A of Comparative Example C1 and the TGA weight loss for F9 measured in Step A were averaged to predict a weight loss for the melt mixed blend. The results are listed in Table 6.

TABLE 6

TGA results, 30 minutes at 275° C., in air

| Example | 80/20 blend | Measured % Wt loss | Predicted* % Wt loss | Weight Loss Ratio** |
|---|---|---|---|---|
| C4 | V4 & HALS | 5.589 | 1.074 | 5.20 |
| 3 | F5 & HALS | 1.056 | 1.084 | 0.96 |
| 4 | F9 & HALS | 1.060 | 1.174 | 0.90 |

*Predicted weight loss based on average weight loss of the individual components used to make the 80/20 melt mixed blend.
**Ratio is the actual measured loss divided by the predicted.
Size of TGA test samples ranged from 33 to 38 mg.

The data in Table 6 shows that semi-crystalline fluoroplastics containing a significant amount of $VF_2$ are susceptible to chemical attack by bases. Comparative Example C4 shows a weight loss greater than that predicted from the sum of its individual components. In contrast, the semi-crystalline fluoropolymers of the invention, fluoropolymers F5 and F9, as illustrated by Examples 3 and 4, that contain monomers that do not produce acidic hydrogens in the backbone of the fluoropolymer, do not exhibit this reactive behavior. Although the fluoroplastics used in Examples 3 and 4 contain considerably more hydrogen than that used in Comparative Example C4, they do not exhibit the same reactivity as the fluoropolymer used in Comparative Example C4. Fluoropolymer F5 contains 5.5 times more hydrogen than fluoropolymer V4.

Comparative Example C5

A 3.8 gram sample of the 50/50 milled blend of V1 and HALS produced in Step C of Comparative Example C1 was melt mixed in resin A using the described SP1 method (described below) to produce a combined concentrate containing 1% each of the fluoropolymer V1 and HALS. The resultant mixture was beige in color indicating that the reaction between bases such as HALS and V1 can occur even when the HALS and the fluoropolymer are mixed and diluted in polyethylene.

Example 5

A 3.8 gram sample of the 50/50 milled blend of fluoropolymer F1 and HALS produced in Example 2 was melt mixed into resin A according to the same SP1 method, the resultant mixture contained 1% each of fluoropolymer F1 and HALS, and was white in color. This indicates that polymers of the invention are not prone to discoloration in the presence of bases when admixed into polyolefins.

II. EVALUATION OF EXTRUDABLE SAMPLES BY USING CAPILLARY RHEOMETRY TESTING

A. SAMPLE PREPARATION FOR CAPILLARY RHEOMETRY TESTING (SP1)

Formulations for capillary rheometry testing were prepared using a Haake Rheocord™ System 40 torque rheometer and Rheomix™ 3000E mixing bowl attachment fitted with roller blades. The mixing sequence began with a two minute material loading period at 15 rpm, during the third minute the rotor speed was increased to 50 rpm and held constant for the duration. The temperature of the bowl was initially programmed at 230° C. for one minute and then decreased to 180° C. for the duration. The entire mixing cycle lasted for eight minutes. Total batch size was 190 grams, final melt temperatures of the sample were in the range of 180° to 200° C. Masterbatch concentrates of fluoropolymers were prepared at a 2% level with a total batch size of 190 grams in resin A, and the mixture was allowed to cool below its Tm. The cooled mixture was chopped into small pieces with a hydraulic bale cutter.

Compositions containing lower fluoropolymer concentrations were prepared by diluting the above-described 2% fluoropolymer concentrate with more polyethylene resin using the procedure described above to mix the desired amounts of polyethylene and fluoropolymer concentrate. Typical fluoropolymer test levels were 500 ppm or in some cases 1000 ppm. The cooled mixtures were again chopped and then ground at ambient temperature in a No. 4 Wiley™ mill fitted with a screen with 1 cm openings.

The concentrates used in the following Examples were either produced using the above-described SP1 method, using twin screw method described in the Examples in Section III (A), or was a concentrate of 3% fluoropolymer V2, Dynamar™ FX-9613, commercially available from Ampacet, product #10925.

B. CAPILLARY RHEOMETRY EVALUATIONS

Experiments were conducted using an Instron™ 4202 or 4204 mainframe fitted with a 3210 capillary rheometer barrel. The die had a flat entry with a 0.508 mm diameter and a length to diameter ratio (L/D) of about 40/1. Test temperatures were at 190°, 210°, 230° or 250° C. Ground samples prepared according to the SP1 method were packed into the rheometer barrel and allowed to dwell for 10 minutes. This was done to ensure a uniform melt temperature before the testing was begun.

Samples were initially extruded at a shear rate of either 600 or 400 $s^{-1}$, a strip chart recorder displayed the pressure on the capillary piston versus time. As a sample containing a fluoropolymer was extruded, the pressure would decrease, indicating if the fluoropolymer was serving to reduce the required force of extrusion. When the pressure reached an equilibrium, the shear rate was decreased to the lowest test value, and again allowed to proceed until a new equilibrium was reached and the apparent viscosity was recorded. The shear rate was then increased in a stepwise manner, with the equilibrium viscosity recorded at each shear rate. If a sample had not reached an equilibrium by the end of the test, (before the capillary barrel had emptied), the barrel was reloaded and the test continued. Samples of the extrudate were collected at each shear rate, were allowed to air-cool and were then visually inspected for melt fracture under a optical microscope at 30× magnification. Strand surfaces were classified as either smooth (free of any visible surface defects), sharkskined, or cyclic melt fractured (CMF). The latter was also detectable by a saw-toothed pattern displayed on the strip chart recorder. The apparent viscosities recorded were not corrected for die entrance effects.

At the conclusion of each test, the capillary die was removed, and the barrel cleaned with a brush and cotton gauze. The die was reinserted and the barrel was loaded with a concentrate of 70% $CaCO_3$, product HM-10 available from Heritage Plastics. This purge material was extruded at a shear rate of 2000 $s^{-1}$. When emptied, the barrel was again cleaned and then loaded with Resin A, approximately one-half of the barrel was extruded at 2000 $s^{-1}$, the rate was then decreased to 400 $s^{-1}$ and then to 100 $s^{-1}$. The extruded filament was observed at both rates and the viscosities recorded. If the filament did not exhibit melt fracture on 100% of its circumference, or if the viscosities were not similar to previously established values, the entire purge procedure was repeated. This purging step was performed to insure that the entire rheometer was free of fluoropolymer from the previous test. If after repeating the purge procedure, the Resin A still did not exhibit the previous results, the capillary die was placed in a pyrolysis oven at 400° C. for 20 minutes to remove all polymer residues.

The base resins, without fluoropolymer additives, were tested in the same manner to establish base lines for comparison. Using these baselines, the percent decrease in apparent viscosity provided by the presence of a fluoropolymer can be determined as a function of shear rate. The percent decrease is defined here as the difference in apparent viscosity for a polymer without fluoropolymer (V) and with fluoropolymer (Vp), divided by the viscosity for the base polymer without the fluoropolymer (V), % decrease=(V−Vp)/V.

C. EXAMPLES

Comparative C6

A sample of resin A was tested in the capillary rheometer at 190° C. and 210° C. by the described method to generate a viscosity shear rate profile. The results at 190° C. are presented in Table 7.

Comparative Example C7

A sample containing 500 ppm fluoropolymer V1 in resin A was produced by the previously described SP1 method and tested in the capillary rheometer at 190° C. The results are presented in Table 7.

Example 6

A melt mixed sample containing 1000 ppm of fluoropolymer F1 in resin A was prepared by the SP1 method and tested in the capillary rheometer at 190° C. The results are presented in Table 7.

Comparative Example C8

19 grams of the concentrate produced in Comparative Example C5 was diluted into resin A according to the SP1 method to produce a sample containing 1000 ppm each of fluoropolymer V1 and HALS. The sample was evaluated in the capillary rheometer at 190° C. as described. The results are presented in Table 7.

Example 7

19 grams of the concentrate produced in Example 5 was diluted into resin A according to the SP1 method to produce a sample containing 1000 ppm each of the fluoropolymer F1 and HALS. It was tested in the capillary rheometer at 190° C. The results are presented in Table 7.

TABLE 7

Capillary rheometer data, 190° C., in Resin A

| Examples | Additives | Viscosity (P) and Surface Characteristics at Shear Rate (s$^{-1}$) | | | Shear Rate at CMF Onset (s$^{-1}$) |
|---|---|---|---|---|---|
| | | 200 | 400 | 1000 | |
| C6 | — | 14050 SS | 9040 SS | — CMF | 600 |
| C7 | V1 | 5610 Sm | 4520 Sm | 3460 Sm | >1400 |
| 6 | F1 | 10110 Sm | 6270 Sm | 3690 Sm | >1400 |
| C8 | V1 & HALS | 14360 SS | 9150 SS | — CMF | 600 |
| 7 | F1 & HALS | 13750 Sm | 7510 Sm | 3930 Sm | 1400 |

Surface characteristics
Sm: Smooth
SS: Sharkskin
CMF: Cyclic Melt Fracture

The data in Table 7 shows that although the fluoropolymer V1 in Comparative Example C7 functioned as a process aid in the absence of non-reactive additives, the addition of HALS, as illustrated by Comparative Example C8, completely eliminated the effectiveness of fluoropolymer V1. Comparative Example C8 gave the same extrusion behavior as the base resin A in Comparative Example C6 which contained no fluoropolymer. In contrast, the same level of fluoropolymer F1 with HALS in Example 7, eliminated the sharkskin, postponed the onset of cyclic melt fracture, and provided a decrease in the apparent viscosity. Surprisingly, the hydrogen content of the fluoropolymer F1 is nearly twice that of the fluoropolymer V1 (see Table 1). Thus, in the selection of a fluoropolymer process aid that is chemically-resistant at thermoplastic polymer processing conditions, the amount of hydrogen in a fluoropolymer is not as important as the type of monomers used.

A more precise selection of the properties of fluoropolymer F1 would allow it to provide further reductions in apparent viscosity at lower use levels.

Examples 6 and 7 and Comparative Examples C6–C8 were designed to simulate the interactions between fluoropolymer process aids and commonly used light stabilizing additives that occur during commercial polyolefin extrusion production. Such interactions may be worse in commercial-scale extrusion equipment because commercial extrusions runs occur over long periods of time, there is a greater degree of mixing in commercial extrusion equipment, and extrudable compositions have longer residence times in commercial-scale extruders.

Comparative Example C9

A sample with 500 ppm fluoropolymer V2 in resin A was prepared according to the SP1 method and evaluated in the capillary rheometer at 190° C. The percent reduction in apparent viscosity provided by fluoropolymer V2 was calculated and is listed in Table 8.

Comparative Example C10

Same as Comparative Example C9, but resin B was substituted for resin A. The results are in Table 8. Resins A and B have the same specifications for melt index, density and co-monomer (see Table 2), but resin B contains a smaller amount of thermal stabilizer than resin A.

Example 8

A sample containing 500 ppm fluoropolymer F5 in resin A was prepared according to the SP1 method and tested in the capillary rheometer at 190° C. The results are listed in Table 8.

Example 9

A sample similar to that of Example 8, except that resin B was substituted for resin A, was prepared and evaluated according to the procedure described in Example 8. The results are listed in Table 8.

TABLE 8

Capillary rheometer data, 190° C.

Apparent Viscosity Reduction, (%), at Particular Shear Rates (sec−1)

| Example | Add | Resin | 50 | 100 | 400 | |
|---------|-----|-------|------|------|------|---------|
| C9 | V2 | A | 43.0 | 58.5 | 52.6 | |
| C10 | V2 | B | 4.9 | 15.6 | 34.5 | |
| | | | | | | Average |
| Retention of Viscosity Reduction (%) | | | 11.4 | 26.7 | 65.6 | 35.65 |
| 8 | F5 | A | 19.9 | 30.8 | 43.7 | |
| 9 | F5 | B | 17.5 | 26.5 | 40.0 | |
| | | | | | | Average |
| Retention of Viscosity Reduction (%) | | | 87.9 | 86.0 | 91.5 | 88.6 |

*All examples were free of melt fracture at the shear rates tested.

Although the viscoelastic properties of fluoropolymer F5 are not optimally matched to base resins A and B, F5 still eliminated melt fracture and reduced the apparent viscosity. When fluoropolymer F5 was tested in the less stabilized resin B, as illustrated by Example 9, it provided a larger decrease in apparent viscosity than that achieved by polymer V2 tested under the same conditions (see Comparative Example C10). Fluoropolymer F5 was less affected by under-stabilized polyethylene than fluoropolymer V2, because fluoropolymer F5 retained a larger percentage of its ability to reduce apparent viscosity.

Examples 8 and 9 and Comparative Examples C9 and C10 were designed to simulate the "consumption" of anti-oxidants that can occur in larger commercial extruders. Consumption, which may not always be demonstrated in studies involving the capillary rheometer, is more common in commercial extruders possibly because of the greater shearing and mixing, longer residence times, and/or higher melt temperatures achieved in commercial extruders. The data indicates that some of the fluoropolymer process aids of the invention are particularly efficient because they continue to function as process aids even under conditions of anti-oxidant consumption.

Comparative Example C11

The sample produced in Comparative Example C9 was tested in the capillary rheometer at 210° C. as previously described. The extrudate was smooth, and the results are presented in Table 9. The data from Comparative Example C6 was used to calculate the percent decrease in apparent viscosity.

Comparative Example C12

A commercial concentrate containing 10% of HALS Chimassorb™ 944, Ampacet product #100438, was diluted into resin A along with a concentrate of fluoropolymer V2 to produce a sample containing 1000 ppm HALS and 500 ppm of fluoropolymer V2 according to the previously described SP1 method. The resultant mixture was evaluated in the capillary rheometer at 210° C. The extrudate was smooth, and the results are presented in Table 9. The data from Comparative Example C6 was used to calculate the percent decrease in apparent viscosity.

Comparative Example C13

A sample containing 1000 ppm of the HALS in resin B was mixed using the SP1 method. The resultant mixture was evaluated in the capillary rheometer at 210° C. The surface of the extrudate had sharkskin melt fracture and exhibited CMF at 1400 s$^{-1}$.

Comparative Example C14

A sample containing 1000 ppm of HALS and 500 ppm fluoropolymer V2 in resin B was mixed using the previously described SP1 method. The resultant mixture was evaluated in the capillary rheometer at 210° C., the extrudate displayed sharkskin melt fracture at all shear rates tested below the onset of CMF. The data from Comparative Example C13 was used to calculate the percent decrease in apparent viscosity. The results are presented in Table 9.

Example 10

A sample containing 1000 ppm of HALS and 500 ppm fluoropolymer F5 in resin B was mixed according to the SP1 method. The resultant mixture was evaluated in the capillary rheometer at 210° C., the extrudate was smooth at all shear rates tested. The data from Comparative Example C13 was used to calculate the percent decrease in apparent viscosity. The results are reported in Table 9.

TABLE 9

Capillary rheometer data, 210° C.

| Ex. | Additives | Resin | % Apparent Viscosity Decrease at Shear Rate (s$^{-1}$) | | | | | Shear Rate at CMF Onset (s$^{-1}$) |
|-----|-----------|-------|------|------|------|------|------|--------|
| | | | 100 | 200 | 400 | 600 | 1000 | |
| C11 | V2 | A | 47.2 | 55.2 | 51.4 | 45.2 | — | >1400* |
| C12 | V2 & HALS | A | 15.2 | 20.3 | 24.9 | 23.6 | — | >1400* |
| C14 | V2 & HALS | B | 0 | 0 | 0 | 0 | CMF | 1000 |
| 10 | F5 & HALS | B | 21.8 | 33.7 | 39.8 | 39.2 | 34.0 | >1400* |

CMF: Cyclic Melt Fracture
*test was terminated at 1400 s$^{-1}$.

The data in Table 9 shows that the addition of HALS to resin A which contained V2 impaired the ability of this fluoropolymer to function. As illustrated by Comparative Examples C12 and C11, the % decrease in apparent viscosity provided by V2 was about half of what it was in the absence of HALS. As illustrated by Comparative Example C14, the addition of fluoropolymer V2 and to resin HALS B (which contained a minimal level of antioxidant) had no apparent effect on the apparent viscosity. V2 was also unable to eliminate sharkskin and unable to postpone the onset of CMF. The fluoropolymer of the invention, F5, was able to eliminate the melt defects, postpone CMF, and provide a reduction in apparent viscosity even in the presence of HALS. Both the prior art fluoropolymer V2 and fluoropolymer F5 have about the same weight percent hydrogen in their structure, see Table 1.

Example 10 and Comparative Examples C11–C14 were designed to demonstrate what can occur in an industrial setting when multiple factors, such as anti-oxidant consumption and interfering additives, are simultaneously impacting the performance of a fluoropolymer process aid.

Comparative Example C15

Resin A was tested in the capillary rheometer at 190°, 210°, & 230° C. The extrudate exhibited sharkskin melt fracture below the onset of CMF.

Comparative Example C16

A sample containing 500 ppm of fluoropolymer V11 in Resin A was prepared according to the previously described SP1 method and tested in the capillary rheometer at 190° and 210° C. The data from Comparative Example C15 was used to calculate the percent decrease in apparent viscosity. The results are listed in Table 10.

Comparative Example C17

A sample containing 1000 ppm of fluoropolymer V11 in Resin A was prepared by the SP1 method and tested in the capillary rheometer at 210° C. The data from Comparative Example C15 was used to calculate the percent decrease in apparent viscosity. The results are listed in Table 10.

Example 11

A sample containing 500 ppm of fluoropolymer F5 in Resin A was prepared according to the SP1 method and tested in the capillary rheometer at 190°, 210°, and 230° C. The data from Comparative Example C15 was used to calculate the percent decrease in apparent viscosity. The results are listed in Table 10.

TABLE 10

Capillary rheometer data

| Ex. | Conc. (ppm) | Temp (°C.) | % Apparent Viscosity Decrease at Shear Rate (s$^{-1}$) | | | | |
| --- | --- | --- | --- | --- | --- | --- | --- |
| | | | 100 | 200 | 400 | 600 | 1000 |
| C16 | 500 | 190 | 29.2 | 41.9 | 41.9 | —* | —* |
| | 500 | 210 | 1.2 | 29.8 | 29.8 | 35.5 | —* |
| C17 | 1000 | 210 | 3.6 | 35.6 | 35.6 | 37.9 | —* |
| 11 | 500 | 190 | 17.1 | 38.1 | 38.1 | —* | —* |
| | 500 | 210 | 15.2 | 33.7 | 33.7 | 34.9 | —* |
| | 500 | 230 | 8.9 | 36.2 | 36.2 | 38.6 | 35.7 |

*Resin A enters CMF at 600 s–1 at 190° C. and 1000 s–1 at 210° C., hence the viscosity and shear stress can not be measured. Therefore, the % decrease from the process aid can not be calculated.

Resin A in Comparative Example C15 exhibited sharkskin melt fracture at shear rates below the cyclic melt fracture onset (CMF). Example 11 containing fluoropolymer process aid according to the invention gave smooth and glossy extrudates, and postponed the onset of cyclic melt fracture.

The data of Table 10 also shows that fluoropolymer processing additives of the invention, with their broader molecular weight distributions (MWD), give better performance over a range of extrusion temperatures than fluoropolymers having a narrower molecular weight distribution (i.e., V11). This is true even though fluoropolymer V11 has a closer viscosity match to the resin than fluoropolymer F5. 500 ppm of fluoropolymer F5 provided a larger decrease in apparent viscosity at 210° C. than twice the level of V11.

Example 12

The percent decrease in apparent viscosity provided by fluoropolymer F5 in Example 11 was plotted against the shear stress measured for the base resin in Comparative Example C15. The results at 190° and 230° C. are in shown FIG. 1.

The shear rate for cyclic melt fracture onset (CMF) in an unmodified LLDPE is known to increase with temperature. However, the shear stress for CMF is a constant regardless of the processing temperature (Tp). Thus, plotting decrease in apparent viscosity as a function of shear stress rather than shear rate, will correct the plot for viscosity changes in the base LLDPE resin due to temperature changes. FIG. 1 shows that the performance of fluoropolymer F5 increased with increasing extrusion processing temperature (Tp). Surprisingly, it also shows that the performance of the fluoropolymer process aid F5 improved as the Tp diverged from the end of melt point ($T_{m, end}$) of the fluoropolymer F5. The Tp of 230° C. is 55° C. greater than the $T_{m, end}$ for the fluoropolymer F5 (175° C.). This is surprising in view of the teaching of U.S. Pat. No. 5,266,639 (Chapman, Jr. et al.) which teaches that the performance of certain semicrystalline, low melting, fluoropolymer process aids will improve as the Tp and $T_{m,end}$ converge. Proper selection of the viscoelastic properties of the fluoropolymers, as taught by the present invention, will provide processing improvements over a broader range of extrusion.

Comparative Example C18

A sample containing 500 ppm fluoropolymer V2 in resin A was prepared according to the previously described SP1 method was tested in the capillary rheometer at 190° and 230° C. The extrudate surface was smooth, results are listed in Table 11.

Example 13

A sample containing 500 ppm fluoropolymer F4 in resin A was prepared by the SP1 method and tested at 190° C. and 230° C. The extrudate surface was smooth, results are listed in Table 11.

TABLE 11

| Example | Temp (°C.) | % Viscosity Reduction, Measured at the Specified Shear Rates (sec–1) | | | |
| --- | --- | --- | --- | --- | --- |
| | | 100 | 200 | 400 | 600 |
| C18 | 190 | 58.5 | 60.2 | 52.6 | —* |
| | 230 | 5.5 | 16.1 | 24.4 | 26.0 |
| | | | | | Average |
| Retention of Viscosity Reduction (%) | | 9.4 | 26.7 | 46.4 | — 27.5 |
| 13 | 190 | 46.1 | 51.4 | 47.4 | —* |
| | 230 | 20.0 | 38.0 | 39.9 | 39.1 |
| | | | | | Average |
| Retention of Viscosity Reduction (%) | | 43.4 | 73.9 | 83.7 | — 76.0 |

*At 190° C., resin A enters CMF at 600 s$^{-1}$, hence the viscosity and shear stress can't be measured and therefore, the % decrease from the process aid can not be calculated.

At 190° C., fluoropolymer F4 in Example 13 exhibited comparable performance to fluoropolymer V2 in Comparative Example C18. At higher temperatures it substantially outperformed fluoropolymer V2 and retained a higher percentage of its ability to reduce the apparent viscosity. The ability of the fluoropolymers of this invention to perform over a broad range of extrusion temperatures is a function of their viscoelastic properties as taught in this invention. This, coupled with their improved chemical and thermal resistance, makes the fluoropolymers of the invention optimal process aids for higher temperature applications such as cast film extrusion for die build-up prevention.

Comparative Example C19

A sample containing 500 ppm fluoropolymer V2 was made in resin A using the SP1 method and tested in the capillary rheometer at 190° C., results are listed in Table 12.

Comparative Example C20

Comparative Example C19 was repeated using fluoropolymer V7 instead of V2. The extrudate was smooth and free of melt fracture. The results are listed in Table 12.

Examples 14–18

Using the SP1 method, a series of samples were produced each containing 500 ppm of a fluoropolymer additive in resin A. All were tested in the capillary rheometer at 190° C. The extrudate surfaces from all the examples was smooth and glossy, results are listed in Table 12.

TABLE 12

Capillary rheometer results, 190° C.

| Example | Additive | $\eta_0$ Ratio* | % Apparent Viscosity Reduction at Shear Rate (sec$^{-1}$) | | | |
|---|---|---|---|---|---|---|
| | | | 50 | 100 | 200 | 400 |
| C19 | V2 | 2.04 | 43.0 | 58.5 | 60.2 | 52.6 |
| C20 | V7 | 74,131 | 5.6 | 16.1 | 32.1 | 34.7 |
| 14 | F5 | 57.5 | 19.8 | 30.8 | 38.6 | 43.7 |
| 15 | F6 | 11.5 | 20.7 | 33.4 | 43.9 | 45.0 |
| 16 | F4 | 0.309 | 34.4 | 47.8 | 51.8 | 47.5 |
| 17 | F8 | 0.295 | 47.1 | 54.5 | 56.0 | 50.3 |
| 18 | F7 | 0.107 | 34.4 | 47.4 | 51.0 | 47.1 |

*$\eta_0$ ratio is the ratio of the zero shear viscosity of the fluoropolymer divided by the zero shear viscosity of the base resin A (see Table 3).

The data of Table 12 demonstrate that careful selection of the viscoelastic properties of the fluoropolymer such as $\eta_0$ and m1 and their relative relationship to the same properties of the host polymer permits maximization of the process aid's performance in the host resin. The data of Table 12 demonstrates that the performance of fluoropolymers F4 to F8 improved as the viscosity ratio approaches the center of the preferred range. The ability of fluoropolymers F4 to F8 to lower apparent viscosity was most noticeable at lower shear rates. While fluoropolymer V7 of Comparative Example C20 provided a decrease in apparent viscosity in the capillary rheometer, its viscosity ratio is far outside the range taught by this invention, as such it is believed that it will not perform nearly as well as those fluoropolymers within the scope of the invention in when used as a processing aid in commercial extrusion equipment.

Comparative Example C21

Resin A was extruded in the capillary rheometer at 250° C. The surface of the extrudate was smooth at shear rates below 200 s$^{-1}$, and displayed sharkskin from 400 s$^{-1}$ until 1800 s$^{-1}$ when it entered CMF. Resin A has a calculated log zero shear viscosity of 4.78 at 250° C.

Example 19

A sample containing 500 ppm of fluoropolymer F4 in resin A was prepared according to the SP1 method and was extruded at 250° C. The sample was smooth and glossy up to 2000 s$^{-1}$, it did not display CMF. The data in Comparative Example C21 was used to calculate the percent apparent viscosity decrease listed in Table 13. Fluoropolymer F4 has a calculated log zero shear viscosity of 2.97 at 250° C.

TABLE 13

Capillary rheometer results, 250° C.

| Example | Additive | $\eta_0$ Ratio* | % Apparent Viscosity Reduction at Shear Rate (sec$^{-1}$) | | | | | |
|---|---|---|---|---|---|---|---|---|
| | | | 200 | 400 | 600 | 1000 | 1400 | 1600 |
| 19 | F4 | 0.015 | 0 | 8.3 | 10.5 | 15.5 | 17.8 | 17.0 |

*$\eta_0$ ratio is the ratio of the zero shear viscosity of the fluoropolymer divided by the zero shear viscosity of the base resin A.

The data of Table 13 shows that fluoropolymers with viscosities much lower than that of the host polymer, but still within the ranges taught by this invention, can provided processing improvements.

Comparative Example C22

A sample containing 500 ppm of fluoropolymer V9 in resin A was prepared according to the SP1 method and tested in the capillary rheometer at 190° C., results are listed in Table 14.

Example 20

A sample containing 500 ppm fluoropolymer F1 in resin A was prepared according to the SP1 method and tested at 190° C. and 230° C., results are listed in Table 14.

TABLE 14

| Example | Additive | Temp (°C.) | % Apparent Viscosity Reduction at Shear Rate (sec$^{-1}$) | | | |
|---|---|---|---|---|---|---|
| | | | 50 | 100 | 200 | 400 |
| C22 | V9 | 190 | 5.0 | 8.1 | 23.6 | 32.0 |
| 20 | F1 | 190 | 7.8 | 20.2 | 29.9 | 32.4 |
| | F1 | 230 | 0 | 0.3 | 0.8 | 3.9 |

The data of Table 14 show that although fluoropolymers V9 and F1 have the same Mooney viscosity and same monomer composition and similar log ($\eta_0$), the fluoropolymer F1 outperformed fluoropolymer V9. It is believed that V9 contains ethylenic unsaturations which provide a site for attack, for example by peroxide. This process for unsaturation also turns the V9 black in color which makes it undesirable for use as a polyolefin processing aid. Fluoropolymers with unsaturation are also less desirable in a polymer formulation in resins that are insufficiently stabilized because peroxides that form within the polyolefin during extrusion may react with the ethylenic unsaturations present in the fluoropolymer.

Example 21

A sample with 1000 ppm fluoropolymer F9 in resin E was blended according to the previously described SP1 method and was tested in the capillary rheometer at 230° C. The ratio of zero shear viscosities of F9 and resin E at 230° C. Capillary rheometer results are listed in Table 15.

Comparative Example 23

A sample containing 2.5% of resin A in resin E was mixed using the SP1 method and was tested in the capillary rheometer at 230° C. The results are listed in Table 15.

TABLE 15

| | Capillary rheometer data, 230° C. | | | |
|---|---|---|---|---|
| | Comp. Ex. C23 | | Example 21 | |
| Shear Rate (sec$^{-1}$) | Poise | CMF, psi oscillation | Poise | CMF, psi oscillation |
| 50 | 23510 | — | 18350 | — |
| 100 | 15190 | — | 11200 | — |
| 200 | 9930 | — | 7050 | — |
| 400 | 6310 | — | 4420 | — |
| 600 | CMF | 220 | CMF | 20 |
| 800 | CMF | 220 | CMF | 20 |
| 1000 | CMF | 220 | 1900 | — |
| 1200 | CMF | 220 | 1660 | — |
| 1400 | 1580 | — | 1495 | — |

*Value determined from strip chart recorder when extrudate exhibits cyclic melt fracture.

The filaments for both the Comparative Example C23 and Example 21 that were extruded below 400 s$^{-1}$ had a surface appearance often characterized in HDPE as "orange-peel". This surface is thought to be related to the crystallization of the polyethylene and not due to melt fracture. The data of Table 15 show that fluoropolymer F9 provided a significant reduction in apparent viscosity and substantially reduced and/or eliminated CMF at the various shear rates tested.

III. EVALUATION OF EXTRUDABLE COMPOSITIONS ON A BLOWN FILM LINE

A. DESCRIPTION OF THE BLOWN FILM EVALUATION METHOD

Concentrates of fluoropolymers for evaluation in a blown film line were prepared at a level of 2% in resin C (see Table 2), which was stabilized with 1000 ppm Irganox™ 1076 and 1000 ppm Irgafos™ 168 (both available from Ciba-Geigy). The concentrates were compounded using a Haake Rheomix™ 100 counter-rotating, intermeshing, conical twin screw extruder. Prior to compounding, the resin, antioxidants and fluoropolymer additive were dry-blended in a pail tumbler. This powder blend was starve-feed to the compounder at a nominal rate of 4.5 kg/hr. The extruder was operating at 200 rpm, with an extrusion profile of 140°/200°/220° C. and die temp of 220° C. The extrudate was water quenched and strand pelleted. The resulting pellets were collected in a plastic one gallon container, hand mixed by shaking, and passed through the extruder a second time to ensure adequate dispersion and distribution of the fluoropolymer within resin C.

Films were produced using a Kiefel blown film line with a 40 mm, 24/1:L/D, grooved feed extruder. The die was of spiral design, with a diameter of 40 mm and a die gap of 0.6 mm. An adjustable single lip air ring with chilled air was used for cooling. An iris and sizing cage provided further bubble stability. Film was produced with a nominal gauge of 25 microns.

The Kiefel extruder and die zones were set at 200° C. and the die adapter zone was adjusted in the range of 210° to 220° C. to maintain a target melt temperature of 205° C. The screw was maintained at about 45 rpm to deliver an output of about 13.6 kg/hr corresponding to a shear rate of about 660 s$^{-1}$. The film winder was set at 12.2 m/min.

Prior to each evaluation it was necessary to ensure that the blown film line was free of residual fluoropolymer from the previous evaluation. This was accomplished by extruding approximately 9 kg of a 70% calcium carbonate masterbatch (product #HM-10, Heritage Plastics) followed by 4.5 kg of Dowlex™ 685 polystyrene and 4.5 kg of the resin being tested. All three materials were extruded at the maximum allowable rpm below the pressure limit of the extruder. The base resin was then extruded into film, under the original conditions for a minimum of one hour, until the previously determined extrusion pressure was achieved and the resultant film was fully melt fractured.

Samples for extrusion were prepared by weighing the required amount of fluoropolymer additive concentrate, pelleted resin and other additive concentrates into a 5 gallon pail and mixing on a pail tumbler for a minimum of 10 minutes. The fluoropolymer additive concentrates used in the following examples were produced as described above using the Haake twin screw extruder or was a commercially available concentrate of 3% FX-9613 (Ampacet product #10925).

The percent melt fracture was determined by taking a section of the film lay flat, opening it along the edge, measuring the individual bands (regions) of melt fracture in the transverse direction of the film, summing their total, and then dividing by the total width of the opened lay flat film.

B. EXAMPLES

Comparative Examples C24

A sample containing 500 ppm of fluoropolymer V10 in resin D was extruded using the described blown film method. The results are listed in Table 16.

Examples 22–23

Two samples containing 500 ppm of a fluoropolymer additive in resin D were extruded using the described blown film method. The results are listed in Table 16.

TABLE 16

| | | Blown film Data, Resin D | | | | | | | | |
|---|---|---|---|---|---|---|---|---|---|---|
| | | $\eta_0$ ratio @ | | % Melt Fracture as a Function of Time (min.) | | | | | | |
| Ex. | Add. | 205° C. | MF | 0 | 10 | 20 | 30 | 40 | 50 | 60 |
| C24 | V10 | 288 | H | 100 | — | — | — | — | — | 29 |
| | | | L | 0 | — | — | — | — | — | 71 |
| | | | C | 0 | — | — | — | — | — | 0 |
| 22 | F4 | 0.093 | H | 100 | — | — | — | — | — | 15 |
| | | | L | 0 | — | — | — | — | — | 52 |
| | | | C | 0 | — | — | — | — | — | 33 |
| 23 | F1 | 1.15 | H | 88 | 80 | 29 | 25 | 10 | 10.5 | 8 |
| | | | L | 12 | 20 | 49 | 10 | 4 | 2 | 2 |
| | | | C | 0 | 0 | 22 | 65 | 86 | 87.5 | 90 |

MF: Melt Fracture
H: Heavy melt fracture
L: Light melt fracture, reduced severity, but still not acceptable
C: Clear, free of melt fracture The data in Table 16 shows that fluoropolymer V10, which had a viscosity ratio that was greater than 100 did not eliminate melt fracture in a blown film line. The blown film line is representative of commercial scale extrusion. However, fluoropolymers F1 and F4 were much more effective in eliminating melt defects under the same conditions. Whether or not melt fracture is eliminated or when it is eliminated by a given concentration of a fluoropolymer will depend in part upon the viscoelastic properties of the fluoropolymer and whether those properties are properly matched to the viscoelastic properties of the base or host polymer. The presence and concentrations of other additives or adjuvants in the base polymer (e.g., hindered amine light stabilizers and the concentration of antioxidants) may also effect how easy it is for the fluoropolymer process aid to eliminate melt defects.

Comparative Example C25

Using the SP1 method, a 220 gram combined concentrate of 20% talc and 2% fluoropolymer V8 in resin B, stabilized with 1000 ppm Irganox™ 1010 (Ciba-Geigy), was prepared. A portion of this blend was diluted into resin A to produce a sample containing 5000 ppm talc and 500 ppm of fluoropolymer V8. This sample was tested in the capillary rheometer at 190° C. The results of the evaluation are listed in Table 17.

Example 24

Using the SP1 method, a 220 gram combined concentrate of 20% talc and 2% of fluoropolymer F5 in resin B, stabilized with 1000 ppm Irganox™ 1010 was prepared. A portion of this blend was diluted into resin A to produce a sample containing 5000 ppm talc and 500 ppm of fluoropolymer F5. This sample was tested in the capillary rheometer at 190° C. The results of the evaluation are presented in Table 17.

TABLE 17

Capillary rheometer data, 190° C.

| Example | Additives | % Apparent Viscosity Reduction at Shear Rate (sec$^{-1}$) | | | |
|---|---|---|---|---|---|
| | | 50 | 100 | 200 | 400 |
| C25 | V8 & talc | 1.2 | 2.2 | 5.2 | 20.6 |
| 24 | F5 & talc | 1.9 | 5.6 | 24.6 | 35.4 |

The data of Table 17 shows that a decrease in the viscosity of the fluoropolymer (F5 has a lower viscosity than V8—see Table 3) provided improved performance in the presence of abrasive additives such as talc anti-blocking agent. This is a surprising result in view of the teaching of U.S. Pat. No. 5,010,130 that increasing the viscosity of the molten portion of the fluoropolymer process aid minimizes the retarding effect of abrasive inorganic fillers on the ability of a process aid to eliminate melt defects. Preferably, the fluoropolymer process aid is somewhat less viscous than the base polymer, and typically a ratio of fluoropolymer process aid viscosity to thermoplastic hydrocarbon polymer viscosity of 0.3 is very effective.

Examples 25–28

Using the SP1 method, a series of samples in resin B, which had been stabilized with 1000 ppm Irganox™ 1010, were prepared. Each sample contained 500 ppm fluoropolymer F5 & 5000 ppm diatomaceous earth anti-blocking agent (available from Ampacet as product #10063). The samples also contained varying levels of various molecular weight polyethylene glycol (PEG). The PEG 8000 was added via a 3% concentrate prepared using a Haake twin screw extruder, PEG 1450 was added via a 2% concentrate prepared by the SP1 method. Each sample was tested in the capillary rheometer at 190° C. The extrudates from all examples were smooth and glossy below the onset of CMF. Results are listed in Table 18.

TABLE 18

Capillary rheometer data, 190° C.

| Ex. | PEG MW | PEG Conc (ppm) | Apparent Viscosity, poise, at Shear Rate (sec$^{-1}$) × 10$^{-2}$ | | | | | | | CMF Onset (sec$^{-1}$) |
|---|---|---|---|---|---|---|---|---|---|---|
| | | | 50 | 100 | 200 | 400 | 600 | 1000 | 1400 | |
| 25 | — | — | 294 | 200 | 128 | 71.5 | 53.1 | 34.7 | CMF | 1400 |
| 26 | 8000 | 250 | 267 | 171 | 102 | 57.8 | 46.4 | 33.9 | CMF | 1400 |
| 27 | 8000 | 1000 | 200 | 115 | 73.2 | 48.6 | 40.0 | 31.4 | 26.3 | 1800 |
| 28 | 1450 | 1000 | 265 | 144 | 72.3 | 43.1 | 33.7 | 25.0 | 21.0 | >2000 |

The data of Table 18 show that the molecular weight (MW) of a polyethylene glycol (PEG) added to the extrudable compositions of this invention will effect the tendency of the composition to melt defect. The data also suggest a relationship between shear rate and performance for differing molecular weight polyethylene glycols.

Various modifications and alterations of this invention will be apparent to those skilled in the art without departing from the scope and spirit of this invention and this invention should not be restricted to that set forth herein for illustrative purposes.

We claim:

1. A chemically resistant, melt-processable composition comprising a blend of:
   (1) one or more melt-processable thermoplastic hydrocarbon polymers;
   (2) an amount effective to improve the processability of the composition of one or more chemically-resistant fluoropolymers comprising interpolymerized units of:
      (a) one or more fluorinated olefin monomers of the general formula:

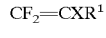
      $$CF_2=CXR^1$$

wherein:
      X is a hydrogen or a halogen atom; and
      $R^1$ is a halogen atom or is an alkyl cyclic alkyl or aryl group having from 1 to 10 carbon atoms; such alkyl or aryl groups may optionally be halogenated and may contain one or more heteroatoms such as oxygen or nitrogen and may be partially-, fully-, or non-halogenated provided, however, that when X is a hydrogen atom $R^1$ contains an allylic carbon atom relative to the α-unsaturation and that allylic carbon atom is not perfluorinated; and
      (b) one or more olefin monomers of the general formula:

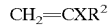
      $$CH_2=CXR^2$$

wherein:
      X is a hydrogen or a halogen atom; and
      $R^2$ is a hydrogen or is a halogen atom with the proviso that $R^2$ and X are not both fluorine; $R^2$ may also be an alkyl, cyclic alkyl, or aryl group having from 1 to 10 carbon atoms any of which may optionally be partially-, fully-, or non-halogenated and may contain one or more heteroatoms;

(3) one or more poly(oxyalkylene) polymer dispersed in said hydrocarbon polymer; wherein the fluoropolymer or fluoropolymers constituting component (2) have a Carreau-Yasuda Equation m1 parameter of about 0.7 or less and wherein the ratio of the melt viscosity of the fluoropolymer or fluoropolymers constituting component (2) to the melt viscosity of the thermoplastic hydrocarbon polymer or polymers constituting component (1) is between 0.01 and 100 at the melt processing conditions of the composition.

2. The composition of claim 1 wherein the concentration of the poly(oxyalkylene) polymers is between 0 and 20 weight percent of the extrudable composition.

3. The composition of claim 1 wherein the poly(oxyalkylene) polymers are of the general formula:

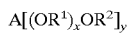

wherein:

A is an active hydrogen-free residue of a low molecular weight, initiator organic compound having a plurality of active hydrogen atoms;

y is 2 or 3;

$(OR^1)_x$ is a poly(oxyalkylene) chain having a plurality of oxyalkylene groups, $(OR^1)$, wherein the $R^1$ moieties can be the same or different and are selected from the group consisting of $C_1$ to $C_5$ alkylene radicals, and x is the number of oxyalkylene units in said chain; and $R^2$ is H or an organic radical, and may contain oxygen or nitrogen heteroatoms.

4. The composition of claim 1 wherein the concentration of poly(oxyalkylene) polymer or polymers is between 0.01 and 5 weight percent of the melt-extrudable composition.

5. The composition of claim 1 wherein one or more of the poly(oxyalkylene) polymers are polyethylene oxide.

6. The composition of claim 1 wherein one or more of the fluoropolymers comprise interpolymerized units of tetrafluoroethylene and propylene.

7. An extrudate comprising the blend of claim 1.

8. An extruded film comprising the blend of claim 1.

* * * * *